(12) United States Patent
Friedrich et al.

(10) Patent No.: US 8,280,249 B2
(45) Date of Patent: Oct. 2, 2012

(54) PLUGGABLE MODULE WITH INTEGRATED TRAFFIC MANAGEMENT FUNCTIONALITY

(75) Inventors: Lars Friedrich, München (DE); Henning Hinderthuer, Finning (DE)

(73) Assignee: ADVA AG Optical Networking, Martinsried, Munich (DE)

( * ) Notice: Subject to any disclaimer, the term of this patent is extended or adjusted under 35 U.S.C. 154(b) by 707 days.

(21) Appl. No.: 12/334,053

(22) Filed: Dec. 12, 2008

(65) Prior Publication Data

US 2009/0162057 A1    Jun. 25, 2009

(30) Foreign Application Priority Data

Dec. 12, 2007  (EP) ..................................... 07123047
May 20, 2008  (EP) ..................................... 08156577

(51) Int. Cl.
*H04B 10/08* (2006.01)
(52) U.S. Cl. ............................... 398/33; 398/34; 398/35
(58) Field of Classification Search .................... 398/22, 398/33–36, 88, 98–99
See application file for complete search history.

(56) References Cited

U.S. PATENT DOCUMENTS

| 2003/0215236 | A1* | 11/2003 | Manifold | 398/79 |
| 2003/0218981 | A1 | 11/2003 | Scholten | |
| 2004/0114931 | A1* | 6/2004 | Talbot | 398/83 |
| 2004/0252688 | A1* | 12/2004 | May et al. | 370/389 |
| 2005/0265329 | A1 | 12/2005 | Havala et al. | |
| 2009/0116845 | A1* | 5/2009 | Li et al. | 398/135 |
| 2009/0317073 | A1* | 12/2009 | Hotchkiss et al. | 398/1 |

FOREIGN PATENT DOCUMENTS

WO    03/084281    10/2003

OTHER PUBLICATIONS

Okamoto S. et al., "IP Backbone Network Utilizing Photonic Transport Network Technologies", Optical Networks Magazine, SPIE, Bellingham, WA, US, vol. 1, No. 1, (Jan. 1, 2001), pp. 19-28.
Office Action dated Mar. 27, 2009 in corresponding European Patent Application 08156577.2.
Office Action dated Mar. 30, 2009 in corresponding European Patent Application 08171513.8.
Office Action dated Mar. 30, 2009 in corresponding European Patent Application 07150171.2.
Office Action dated Mar. 30, 2009 in corresponding European Patent Application 08171352.1.
Office Action dated Apr. 4, 2009 in corresponding European Patent Application 08171052.7.
Office Action dated Apr. 6, 2009 in corresponding European Patent Application 08171206.9.
Office Action dated Apr. 6, 2009 in corresponding European Patent Application 08171376.0.

* cited by examiner

*Primary Examiner* — Dzung Tran
(74) *Attorney, Agent, or Firm* — F. Chau & Associates, LLC

(57) ABSTRACT

The invention relates to a network comprising at least one host device having an interface card connected to a backplane of said host device, wherein said interface card comprises at least one cage for receiving a pluggable module which performs a traffic management of data transported via at least one optical fiber connected to said pluggable module.

14 Claims, 32 Drawing Sheets

State of the art

State of the art

State of the art

State of the art

Fig. 8
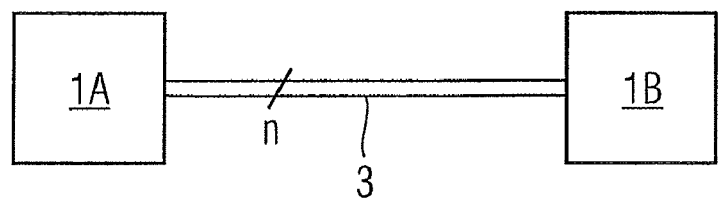
Fig. 9A
Fig. 9B
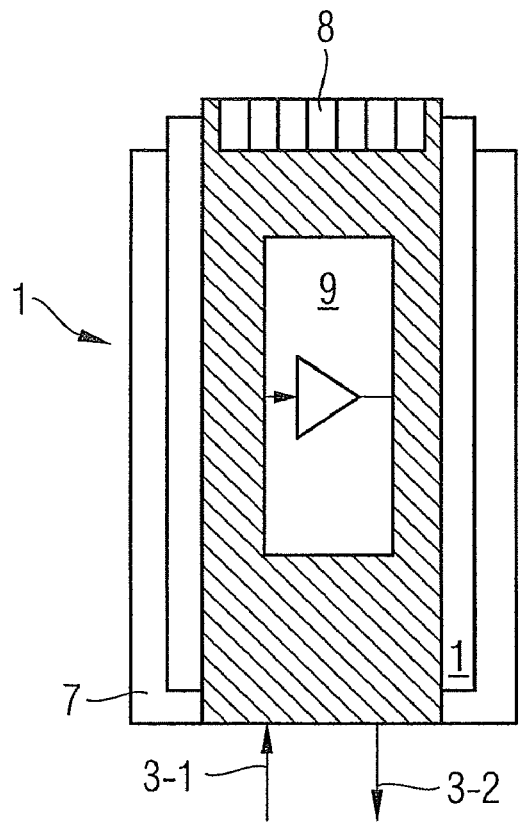
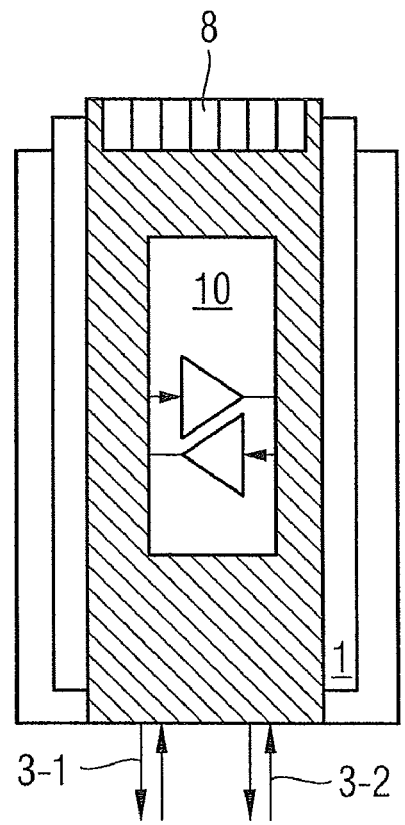

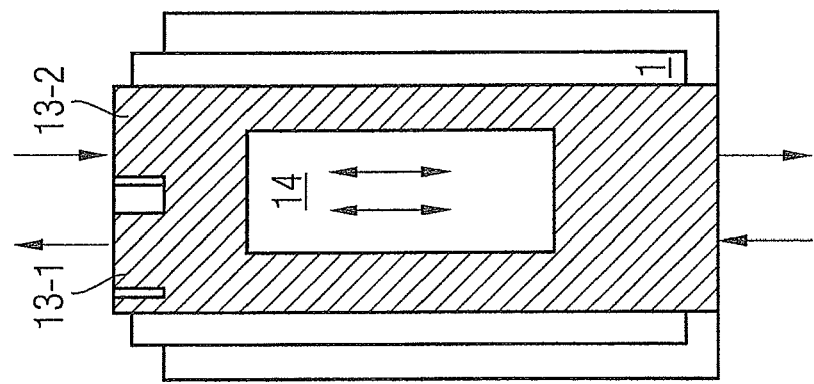
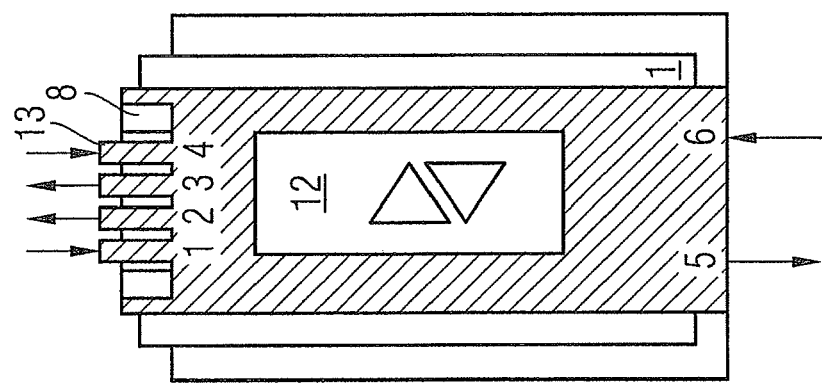
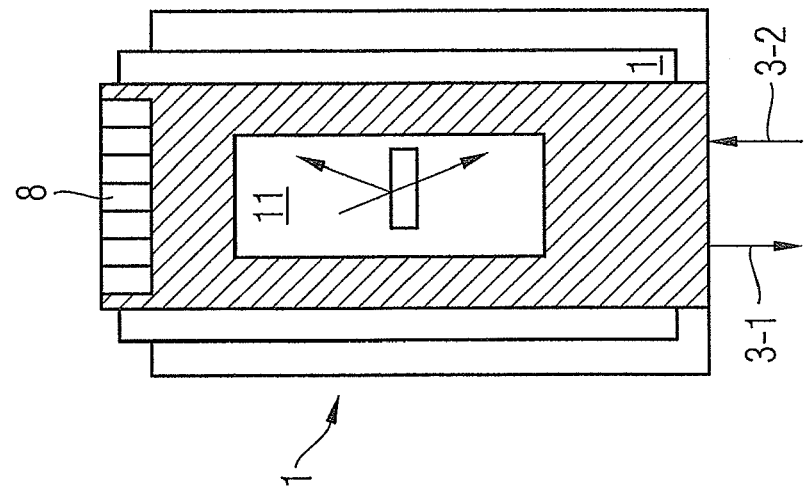

Fig. 9I
Fig. 9J
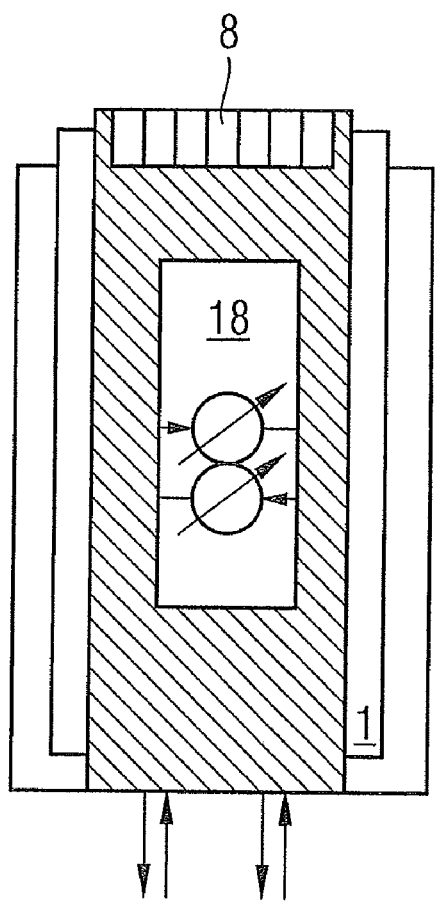
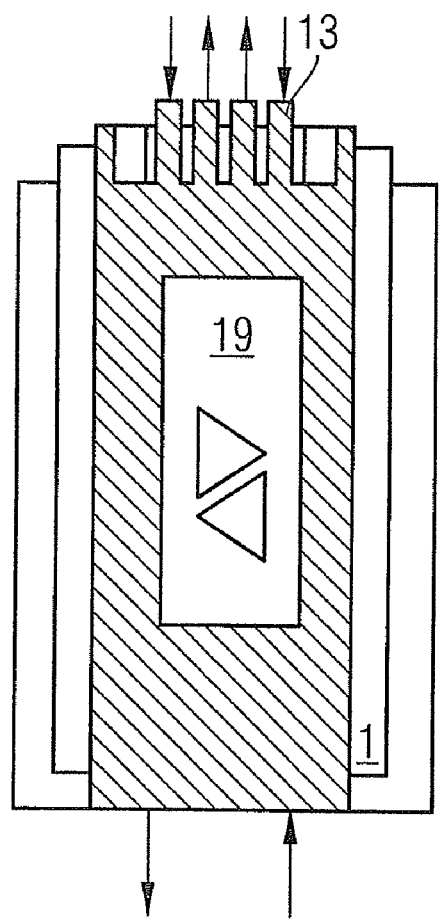

Fig. 15

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin. |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/ low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

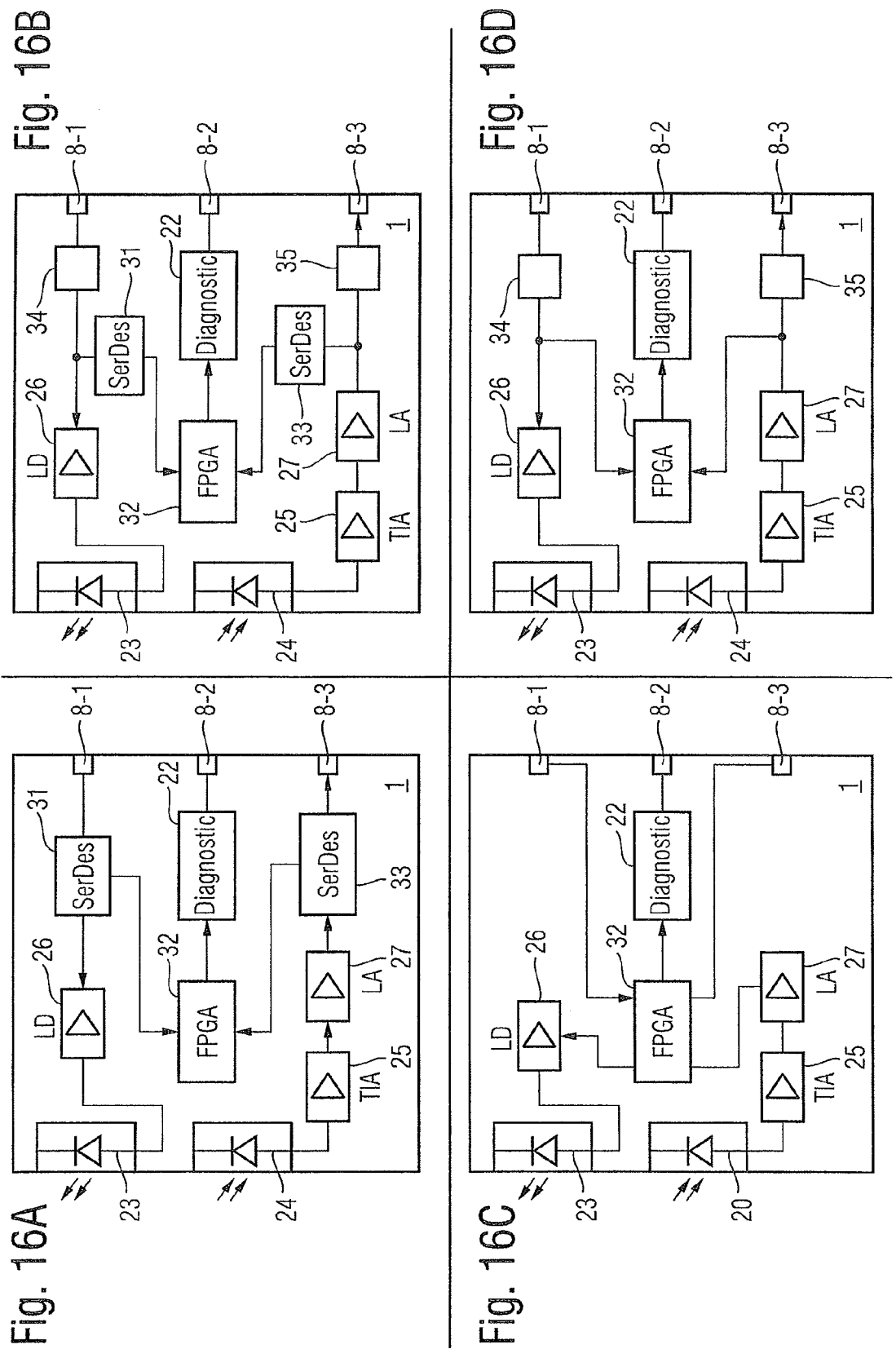

Fig. 17A

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin. |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/ low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

1) Add/drop from West or East

2) Pass through (regeneration)

3) Drop & Continue from West or East

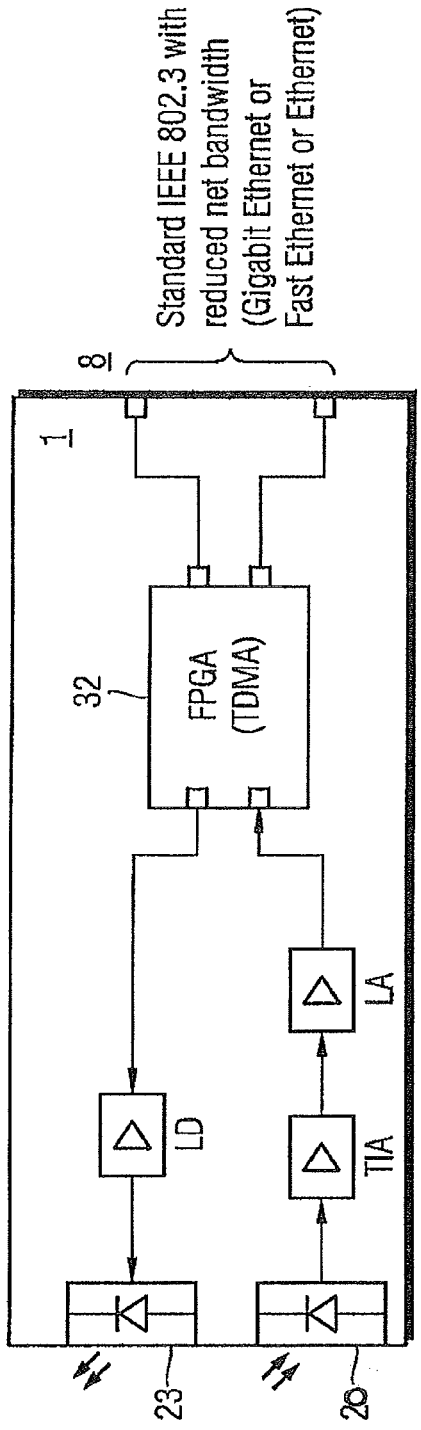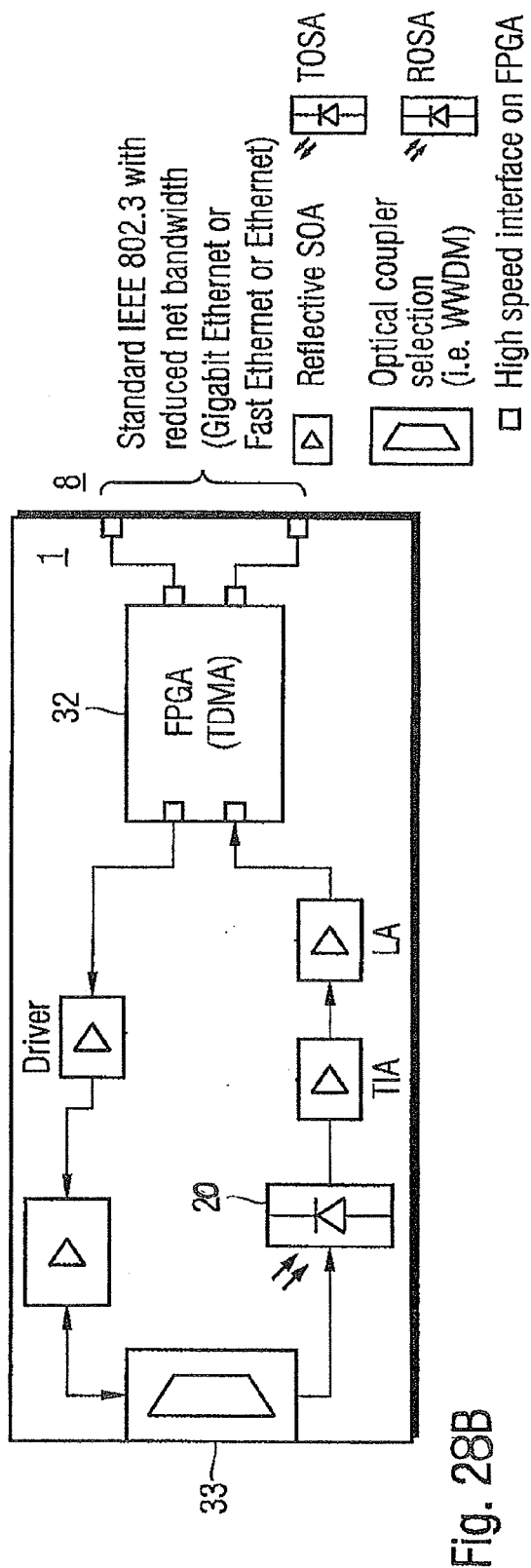
Fig. 28A
Fig. 28B

PLUGGABLE MODULE WITH INTEGRATED TRAFFIC MANAGEMENT FUNCTIONALITY

TECHNICAL BACKGROUND

The invention relates to a method and a network for bidirectional transport of data and in particular to a pluggable module employed by said network for bidirectional transport of data via at least one optical fiber between host devices wherein said pluggable module comprises an integrated data traffic management functionality.

FIG. 1 shows a conventional architecture of an optical network according to the state of the art. The network architecture is hierarchical having the highest data rates in an optical core network, such as a back-bone network of a country. To each core network several optical metro networks can be connected, for instance in a ring structure. To each metro network in turn several access networks can be connected. The edge of the network as shown in FIG. 1 is formed by terminal devices T which can be connected via xDSL (version of Digital Subscriber Line) to a host device, for example to a switch in an DSLAM (Digital Subsciber Line Access Multiplexer). This switch is connected via an optical transport system (designated as FSP in all figures) and optical transport means to a transport system of a local exchange. The core, metro and access network can have a ring structure, for example formed by two optical fibers and by transport systems. The optical fibers can transport data by means of wave length division multiplexing WDM. In wave length division multiplexing WDM optical carrier signals are multiplexed on a single optical fiber by using different wave lengths λ (colours) to carry different data signals. This allows an increased bandwidth and makes it possible to perform bidirectional communication over one strand of fiber. WDM-systems allow to expand the capacity of a network without laying more fiber. The capacity of an optical fiber can be expanded by upgrading multiplexers and demultiplexers at each end. This is often done by using optical-to-electrical-to-optical conversion at the edge of the transport network to permit interoperation with existing equipment. WDM-systems can be divided in different wave length patterns, i.e. conventional or coarse and dense WDM (CWDM, DWDM). A recent development relating course WDM is the creation of GBIC (Gigabit Interface Converter) and Small Form Factor Pluggable (SFP) transceivers using standardized CWDM-wave lengths.

As can be seen from FIG. 1, an optical network can be formed by two main components, i.e. by a transport system and by host devices. Host devices include switching devices, such as routers, bridges, Ethernet switches, fiber channel switches or cross-connects. The network architecture as shown in FIG. 1 comprises optical interconnections, optical transport systems and host devices, such as switches or routers. The separation of functionality in two different device types of the conventional network as shown in FIG. 1, i.e. on the one hand transport of data (by the transport system) and on the other hand aggregation/switching data (by the host devices) increases complexity and costs.

Accordingly, it has been proposed to shift functionality of the transport system, in particular the electrical-to-optical conversion, into the host device by using pluggable transceivers.

A small form factor pluggable (SFP) is a compact optical transceiver using optical communication. A conventional small form factor pluggable module interfaces a network device mother board of a host device, such as a switch or router to an optical fiber or unshielded twisted pair networking cable. The SFP-transceivers are available in a variety of different transmitter and receiver types allowing users to select an appropriate transceiver for each link to provide a required optical reach over the available optical fiber type.

A SFP-transceiver is specified by a multi-source agreement (MSA) between competing manufacturers. The SFP-module is designed after the GBIC-interface and allows greater data port density (i.e. number of transceivers per inch along the edge of a mother board) than GBIC. SFP-transceivers are commercially available and have a capability for data rates up to 4.25 Gbit/sec. A variant standard, XFP, is capable of 10 Gbit/sec.

Some SFP-transceivers support digital optical monitoring functions according to the industry standards SSF 8472 (ftp://ftp.seagate.com/sff/SFF-8472.PDF) multi-source agreement (MSA). This makes it possible for an end user to monitor real time parameters of the SFP-module, such as optical output power, optical input power, temperature, laser bias current and transceiver supply voltage.

FIGS. 2, 3 show a conventional pluggable standard SFP-transceiver module. The SFP pluggable module comprises an electrical interface connecting the pluggable module with a mother board of a host device by plugging the module into a cage of the host device board. On the front side of the pluggable module at least one optical fiber is attached to the module.

FIG. 4 shows a conventional system with pluggable SFP-transceivers according to the state of the art. A host device, such as a switch or router, comprises a controller which is connected via a backplane to interface cards each having several cages which allow to plug in SFP-modules as shown in FIG. 3. A transceiver within the pluggable module performs a conversion of the applied electrical signals to an optical signal which is forwarded via an optical fiber to the transport system. The transport system comprises several cards which comprise several cages for plug-in SFP-transceiver modules. These interface cards allow a switching, i.e. multiplexing or demultiplexing of signals within the electrical domain in response to control signals generated by a controller of the transport system and received via an internal management connection. From the interface cards within the transport system the switched or controlled signals are applied to further modules for optical signals or optical fibers. These modules can, for example comprise variable optical attenuators (VOA), multiplexers/demultiplexers, amplifiers, switchers etc. From the transport system connected to the near end host device, the signals are forwarded via optical fibers to remote far end transport systems over a distance of many kilometers, wherein the remote transport systems are in turn connected to far end host devices.

The conventional system as shown in FIG. 4 has the disadvantage that the complexity of the system is quite high because three domain conversions on the near end side and on the far end side have to be performed. As can be seen from FIG. 4, an electrical signal of the near end host device is converted within the pluggable SFP-transceivers plugged into the interface card of the host device to an optical signal and then retransformed from the optical domain to the electrical domain by a SFP-transceiver plugged into a cage of an interface card of the transport system. After an electrical switching is performed depending on the control signal supplied by the controller of the transport system, the electrical signal is again transformed from the electrical domain into an optical domain by another plugged in SFP-transceiver. Accordingly at the near end side, three domain conversions, i.e. an electrical-to-optical, an optical-to-electrical and an electrical-to-optical conversion are necessary. On the far end side, the three conversions are performed again resulting in a total of six domain conversions. Because of the necessary domain conversions, the technical complexity of the system is quite high. Since two different devices, i.e. a host device and a transport system have to be provided on each side management efforts, the occupied space and power consumption are increased.

Accordingly, it is an object of the present invention to provide a method and a system which minimizes the number of necessary domain conversions and which reduce the complexity of a network system.

SUMMARY OF THE INVENTION

The invention provides a network comprising at least one host device having an interface card connected to a backplane of a host device, wherein the interface card comprises at least one cage for receiving a pluggable module which performs a traffic management of data transported via an optical fiber connected to the pluggable module.

In the network according to the present invention, the pluggable module performs a traffic management of data transported via an optical fiber connected to the pluggable module.

The invention provides a pluggable module for bidirectional transport of data via at least one optical fiber between host devices, wherein said module is adapted to be pluggable into a corresponding cage of one of said host devices to perform a traffic management of the transported data.

In a possible embodiment, the traffic management is performed within the pluggable module in an electrical domain.

In an alternative embodiment, the traffic management is performed by the pluggable module in an optical domain.

In a possible embodiment, the pluggable module is formed by a SFP-module.

In a further embodiment, the pluggable module is formed by a XFP-module.

In a possible embodiment of the pluggable module according to the present invention, the traffic management comprises near end and far end management of the transported data.

In a possible embodiment of the pluggable module according to the present invention, the traffic management is based on a communication between the pluggable module and host devices.

In a possible embodiment of the pluggable module according to the present invention, the traffic management is based on a communication between the pluggable module and host devices, wherein the communication is using a SFF 8742- programming page structure with no adaptions.

In a possible embodiment of the pluggable module according to the present invention, the traffic management is based on a communication between the pluggable module and host devices, wherein the communication is using a SFF 8742- programming page structure with no adaptions and a time division multiplex update procedure to buffer additional near end or far end parameters within the provided SFF 8472- programming page structure.

In a her embodiment of the pluggable module according to the present invention, the traffic management is based on a communication between the pluggable module and host devices, wherein the communication is using a SFF 8742- programming page structure with additional address space.

In a possible embodiment of the pluggable module according to the present invention, the traffic management is based on a communication between the pluggable module and a far end pluggable module.

In a possible embodiment of the pluggable module according to the present invention, the host devices comprise switching devices and optical transport devices.

In a possible embodiment, the switching devices comprise routers, switches, Ethernet switches and fiber channel switches.

In a possible embodiment, the optical transport devices comprise SDH, SONET, PDH, OTH, Ethernet, Fiber Channel, FICON and uncompressed video transport devices.

In an embodiment of the pluggable module according to the present invention, the pluggable module comprises an embedded communication channel (ECC) for exchanging management data, administrative data and performance monitoring data between said pluggable module and a far end pluggable module.

In a possible embodiment of the pluggable module according to the present invention, the embedded communication channel ECC is implemented at a physical layer.

In a possible embodiment of the pluggable module according to the present invention, the embedded communication channel ECC is provided by a side band modulation of a data signal of said transported data.

In a possible embodiment of the pluggable module according to the present invention, the data signal is pulse amplitude modulated.

In an embodiment of the pluggable module according to the present invention, the embedded communication channel ECC is implemented at a protocol layer.

In a possible embodiment of the pluggable module according to the present invention, the embedded communication channel ECC uses a bandwidth not occupied by a transport protocol for exchanging data between the pluggable module and the far end pluggable module.

In a possible embodiment of the pluggable module according to the present invention, the embedded communication channel ECC is provided by amplitude shift keying ASK or frequency shift keying FSK or phase shift keying PSK.

In a possible embodiment of the pluggable module according to the present invention, the embedded communication channel ECC is implemented on a proprietary overhead that is generated on top of a transport protocol.

In a possible embodiment of the pluggable module according to the present invention, the embedded communication channel ECC is implemented based on an overhead of a transport protocol.

In a possible embodiment of the pluggable module according to the present invention, the embedded communication channel ECC is implemented in a frame structure of a protocol.

In a possible embodiment of the pluggable module according to the present invention, the embedded communication ECC is implemented within a protocol layer In an embodiment of the pluggable module according to the present invention, the pluggable module comprises a diagnostic unit which receives local performance data from electronic components of the pluggable module.

In an embodiment of the pluggable module according to the present invention, the electronic components comprise a transmission diode, a receiving diode, a laser driver LD, a transimpedance amplifier TIA and a limiting or linear amplifier.

In an embodiment of the pluggable module according to the present invention, the diagnostic unit comprises an electrical interface with said host device for reporting performance data.

In a possible embodiment of the pluggable module according to the present invention, the electrical interface comprises an I²C bus.

In an embodiment of the pluggable module according to the present invention, the diagnostic unit comprises a memory for storing local performance data of the pluggable module.

In an embodiment of the pluggable module according to the present invention, the pluggable module comprises a mapping unit which controls a laser driver depending on the local performance data received from the diagnostic unit to transfer the performance data via the embedded communication channel ECC to the remote pluggable module.

In an embodiment of the pluggable module according to the present invention, the pluggable module comprises a demapping unit for storing performance data extracted from the embedded communication channel ECC in a memory of the diagnostic unit.

In an embodiment of the pluggable module according to the present invention, the performance data is extracted at a transimpedance amplifier TIA.

In an embodiment of the pluggable module according to the present invention, the performance data comprises SFF 8472-performance parameters.

In an embodiment of the pluggable module according to the present invention, the memory is a SFF 8472-memory comprising unallocated bytes used for exchanging DMI (digital monitoring interface)-performance data with a far end pluggable module.

In an embodiment of the pluggable module according to the present invention, a second set of said SFF 8472-performance data which indicates a performance at the far end is stored.

In an embodiment of the pluggable module according to the present invention, near end or far end digital performance parameters are stored in said memory.

In an embodiment of the pluggable module according to the present invention, the DMI (digital monitoring interface)-performance data comprises a voltage, temperature and laser bias.

In a possible embodiment of the pluggable module according to the present invention, the pluggable module performs near end and far end bidirectional performance monitoring.

In an embodiment of the pluggable module according to the present invention, the pluggable module comprises at least one data processing circuit such as a FPGA for performing performance monitoring.

In an embodiment of the pluggable module according to the present invention, the data processing circuit is connected to a diagnostic unit of the pluggable module.

In a possible embodiment of the pluggable module according to the present invention, the data processing circuit increments at least one performance counter provided in a memory of the diagnostic unit depending on a measured performance indicator.

In an embodiment of the pluggable module according to the present invention, the performance indicator is formed by a BER (bit error rate), a CV (code violation) or by frame drops.

In an embodiment of the pluggable module according to the present invention, the memory of the diagnostic unit is a SFF 8472-memory comprising unallocated bytes used for a ES (error seconds) and a SES (severe error seconds) performance counter.

In an embodiment of the pluggable module according to the present invention, said pluggable module comprises a SERDES (serial deserializer) for supplying data from a transmit data path to said data processing circuit, and a SERDES for supplying data from the reception data path of the pluggable module to said data processing circuit.

In an embodiment of the pluggable module according to the present invention, the pluggable module performs a latency measurement of a latency for transporting data from the pluggable module to a remote far end pluggable module.

In an embodiment of the pluggable module according to the present invention, the pluggable module performs a link test.

In an embodiment of the pluggable module according to the present invention, the pluggable module performs a protocol mapping between two transport protocols.

In an embodiment of the pluggable module according to the present invention, the protocol mapping comprises payload mapping.

In a further embodiment of the pluggable module according to the present invention, the protocol mapping comprises overhead mapping.

In an embodiment of the pluggable module according to the present invention, the transport protocol comprises a OTH, Ethernet, SDH or Sonet data transport protocol.

In an embodiment of the pluggable module according to the present invention, the protocol mapping is configurable.

In an embodiment of the pluggable module according to the present invention, the transport protocols comprise OSI layer 1, OSI layer 2 and OSI layer 3 protocols.

In an embodiment of the pluggable module according to the present invention, the pluggable module performs loop switching.

In an embodiment of the pluggable module according to the present invention, the pluggable module provides a single fiber working (SFW) on both interface ports to provide bidirectional east and west communication within an optical network.

In an embodiment of the pluggable module according to the present invention, the pluggable module provides time slots based add-drop functionality between an optical network interface and an electrical host interface.

In an embodiment of the pluggable module according to the present invention, the electrical host interface is a standard MSA-interface.

In an embodiment of the pluggable module according to the present invention, a configuration of an add/drop protocol bandwidth within a standard protocol and an add/drop network element topology is configurable from the far end side.

In an embodiment of the pluggable module according to the present invention, the pluggable module provides a management protocol between multiple pluggable modules that performs a network topology detection.

In an embodiment of the pluggable module according to the present invention, the pluggable module provides a management protocol between multiple pluggable modules that perform automatic configuration of multiple pluggable modules that are connected to a common network based upon the topology information data and a set of default parameters.

In an embodiment of the pluggable module according to the present invention, the management protocol and configuration capability provides an homogenous distribution of an available protocol bandwidth within the network of pluggable modules.

In an embodiment of the pluggable module according to the present invention, the pluggable module comprises asymmetric TDM (TDMA).

In an embodiment of the pluggable module according to the present invention, the pluggable module performs monitoring and manipulation of optical signals.

In an embodiment of the pluggable module according to the present invention, the pluggable module comprises an optical filter.

In a further embodiment of the pluggable module according to the present invention, said pluggable module comprises a variable optical attenuator (VOA).

In an embodiment of the pluggable module according to the present invention, the pluggable module comprises an optical amplifier.

In an embodiment of the pluggable module according to the present invention, the pluggable module comprises an optical switching device.

In an embodiment of the pluggable module according to the present invention, the pluggable comprises a dispersion compensation unit.

In an embodiment of the pluggable module according to the present invention, the pluggable module comprises an optical power splitter device.

In an embodiment of the pluggable module according to the present invention, the pluggable module comprises an optical loop device.

In an embodiment of the pluggable module according to the present invention, the pluggable module comprises an optical connection device.

The invention further provides an interface card for a host device comprising at least one cage for receiving a pluggable module that performs traffic management of data transported via an optical fiber connected to the pluggable module.

The invention further provides a host device comprising at least one interface card connected to a backplane of the host device, wherein said interface card comprises at least one cage for receiving a pluggable module which performs a traffic management of data transported via an optical fiber connected to the pluggable module.

The invention further provides a network comprising at least one host device having an interface card connected to a backplane of the host device, wherein the interface card comprises at least one cage for receiving a pluggable module which performs a traffic management of data transported via an optical fiber connected to said pluggable module.

The invention further provides a data transport system for transporting bidirectional optical data via at least one optical fiber, wherein at both ends of said optical fiber a pluggable module is attached which performs a traffic management of the transported data.

The invention further provides a method for bidirectional transport of data between host devices of said network via at least one optical fiber, wherein a module attached to said optical fiber is connected to a corresponding cage of one of said host devices and a traffic management during the transport of the optical data is performed by said module.

The invention further provides a computer program comprising instructions for performing a method for bidirectional transport of data between host devices of a network via at least one optical fiber, wherein a module attached to said optical fiber is connected to a corresponding host device and a traffic management during transport of the optical data is performed by the module under control of the computer program.

The invention further provides a data carrier for storing a computer program comprising instructions for performing transport for bidirectional transport of data between host devices of the network via at least one optical fiber, wherein a module attached to the optical fiber is connected to a corresponding cage of one of the host devices and a traffic management during transport of the optical data is performed by the module under control of the computer program.

BRIEF DESCRIPTION OF THE DRAWINGS

In the following, preferred embodiments of the method and system according to the present invention are described with reference to the enclosed figures.

FIG. 8 shows an embodiment of a transport data system according to an embodiment of the present invention;

FIGS. 9A-9J show different embodiments of a pluggable module according to the present invention;

FIG. 15 shows a section within the memory shown in FIG. 14;

FIGS. 16A-16D show block diagrams of possible embodiments of the pluggable module according to the present invention;

FIGS. 17, 17A, 17B show examples of data structures of a memory within possible embodiments of the pluggable module according to the present invention;

FIGS. 28A, 28B illustrate further embodiments of a pluggable module according to the present invention.

DETAILED DESCRIPTION OF EMBODIMENTS

Figure 5:
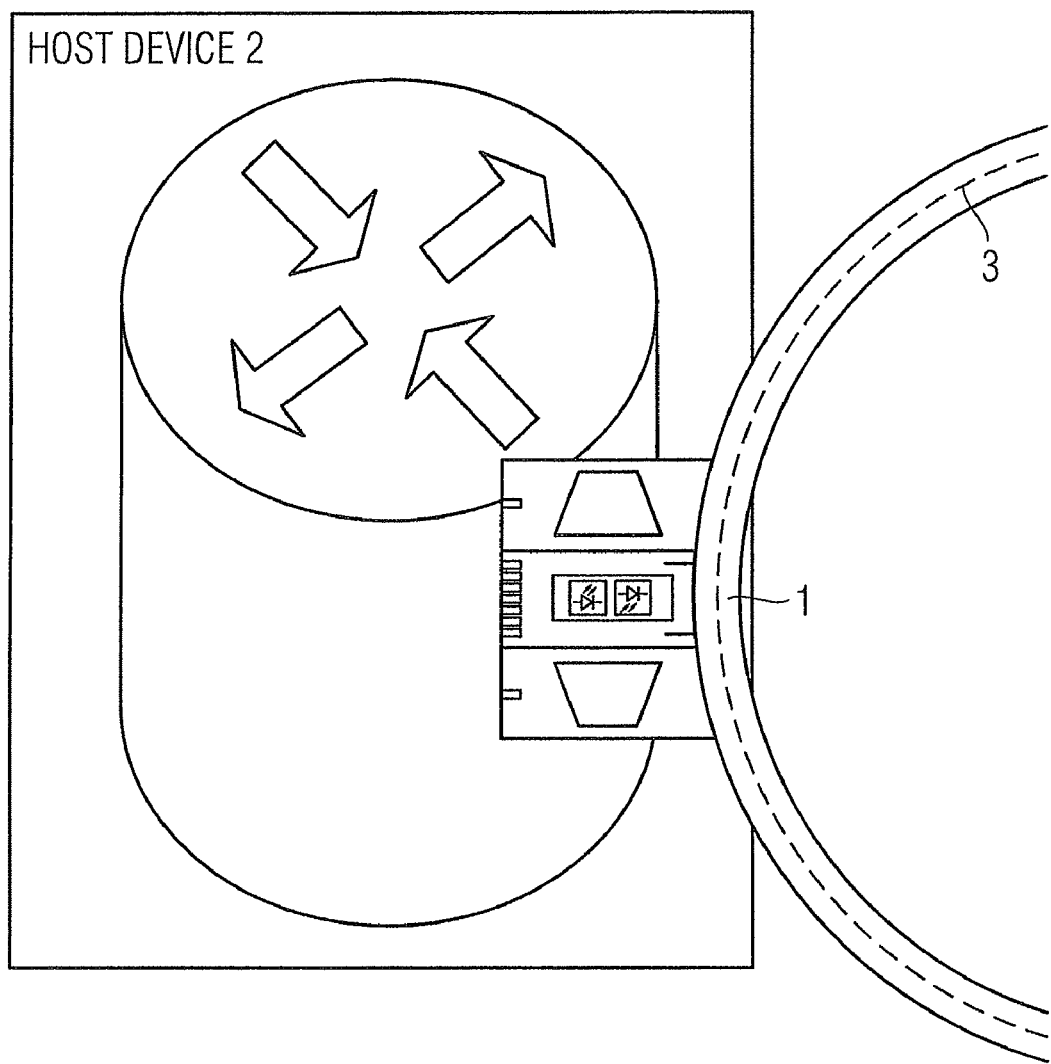
FIG. 5 shows a block diagram of a host device with a plugged in pluggable module according to the present invention.

FIG. 5 shows a pluggable module 1 according to the present invention plugged into a cage of a host device 2. The host device 2 can be a switching device, such as a router, a bridge, an Ethernet bridge or a fiber channel switch. The module 1 as shown in FIG. 5 is adapted to be plugged into a corresponding cage of the host device 2 and performs a traffic management of data which is transported bidirectionally via at least one optical fiber 3 between host devices 2 of a data network. Traffic management comprises the provision of an Embedded Communication Channel (ECC), reporting of DMI data via said Embedded Communication Channel, digital performance monitoring, Latency measurements, performing of link tests, protocol mapping time-slot based ADM, asymmetric TDM as well as optical signal processing.

The traffic management of the data is performed within the pluggable module 1 and can be either performed in the electrical domain or in the optical domain. The pluggable module 1 as shown in FIG. 5 comprises an SFP (small form factor) pluggable module and also supports digital monitoring functions according to SFF 8472. The pluggable module 1 according to the present invention does not only perform transceiver functions, i.e. conversion between the optical and electrical domain, but also data traffic management functions. The data traffic management is performed by the pluggable module 1 as a near end and far end traffic management of the transported data. The data traffic management is formed by a pluggable module 1 on the basis of the communication between the pluggable module 1 and different host devices 2 of the optical network. In a possible embodiment, the communication is using a SFF 8742-programming page structure with no adaptions. In further embodiments, the traffic management can be based on a communication between the pluggable module 1 and host devices 2, wherein the communication is using a SFF 8742-programming page structure with no adaptions and a time division multiplex update procedure to buffer additional near end or far end parameters within the provided SFF 8742-programming page structure. In an alternative embodiment, the traffic management can be based on a communication between the pluggable module 1 and host devices 2, wherein the communication is using a SFF 8742-programming page structure with additional address spaces. The traffic management can be based on a communication between the pluggable module 1 as shown in FIG. 5 and a far end pluggable module which is attached to a remote end of the optical fiber 3 as shown in FIG. 5. The pluggable module 1 as shown in FIG. 5 comprises several transport management functionalities, such as protection switching, performance monitoring, OAM, DCN (Data Communication Network), mapping and framing, amplification, reconfigurable optical add/drop multiplexing (ROADM) and dispersion compensation DC. Further traffic management functionalities can comprise an optical transmission impairment mitigation, such as amplification and chromatic polarization mode compensation.

A traffic management functionality provided by a pluggable module 1 according to the present invention is electrical transmission and impairment mitigation with forward error correction and electronic dispersion compensation.

A further traffic management functionality of the pluggable module 1 according to the present invention can be in one embodiment OAM (operation administration and maintenance) functionalities, such as performance monitoring, default management, inter-device communication, configuration management and security management. In a possible embodiment, the pluggable module 1 according to the present invention comprises optical and/or electrical add/drop multiplexing functionalities. Furthermore, in a possible embodiment, the traffic management functionality of the pluggable module 1 comprises optical conversion with mapping and framing functions. The pluggable module 1 complies in a possible embodiment with existing MSA-agreements, such as SFP, SFP+, XFP, GBIC etc.

Figure 6:
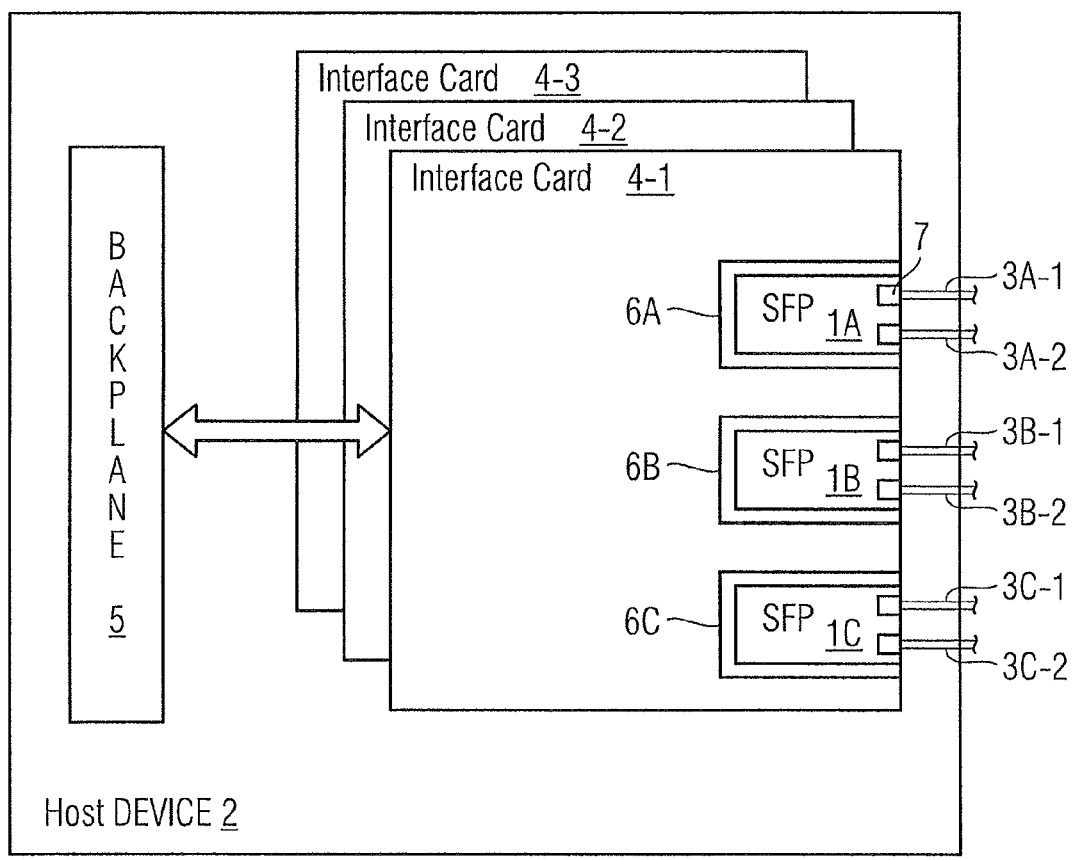
FIG. 6 shows a block diagram of a host device according to an embodiment of the present invention.

FIG. 6 shows a possible embodiment of a host device 2 according to the present invention. The host device 2 comprises at least one interface card 4 connected to a common backplane 5 of the host device 2. Each interface card 4 comprises several cages 6 for receiving pluggable modules 1 according to the present invention. In the given example of FIG. 6, the interface card 4-1 comprises three cages 6A, 6B, 6C for receiving a corresponding SFP pluggable modules 1A, 1B, 1C. Each pluggable module 1 comprises on the front side an optical interface to at least one optical fiber 3. In the given example, each SFP plug-in module 1 as shown in FIG. 6 comprises an interface with two optical fibers for bidirectional optical transport of data. On the rear side, each pluggable module 1 comprises at least an electrical interface for connecting the pluggable module 1 with the circuitry on the interface card 4 of the host device 2.

Figure 7:
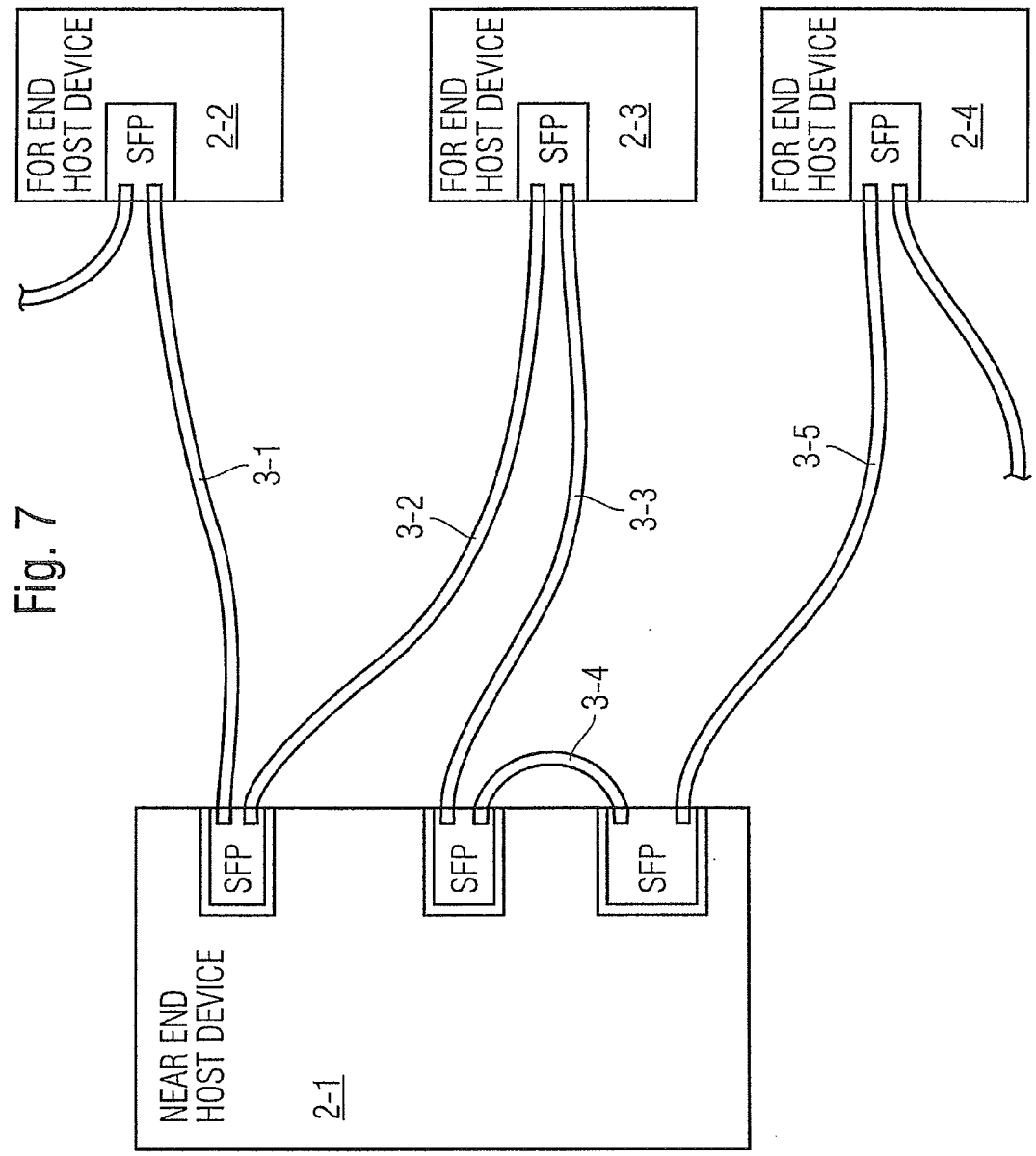
FIG. 7 shows an exemplary arrangement of host devices connected to each other by means of a data transport system according to a possible embodiment of the present invention.

FIG. 7 shows an example for connecting host devices 2 of a network via pluggable modules 1 according to the present invention. In the given example, a near end host device 2-1 can be connected via data transport systems to far end host devices 2-2, 2-3, 2-4. Each data transport system is provided for transporting bidirectional optical data via at least one optical fiber 3. At both ends of the optical fiber 3, a pluggable SFP-module 1 is attached and performs a traffic management of the transported data.

FIG. 8 shows a possible embodiment of a data transport system for transporting bidirectional optical data according to the present invention. As shown in FIG. 8, two pluggable modules 1A, 1B are attached via an optical interface to at least one optical fiber 3 connecting both modules. In a possible embodiment, at least one of the pluggable modules 1A, 1B is capable of performing a data traffic management. In a possible embodiment, both pluggable modules are formed by SFP-modules connected to each other via optical fibers 3.

As can be seen from FIG. 7, with the data transport system according to the present invention as shown in FIG. 8, it is possible to connect a near end host device 2-1 to a far end host device. It is also possible to wire the near end host device 2-1, for example via an optical fiber 3-4 as shown in FIG. 7. As can be seen from FIG. 7, the network according to the present invention has the advantage when compared to the conventional system of FIG. 4 that a separate transport system device in a separate box is no longer necessary so that wiring host devices 2 within the network is much easier and more flexible. Since the separate transport system device is no longer necessary, the optical network using the pluggable modules 1 according to the present invention needs less space and is more transparent to users performing the wiring between the host devices 2.

Figure 1:
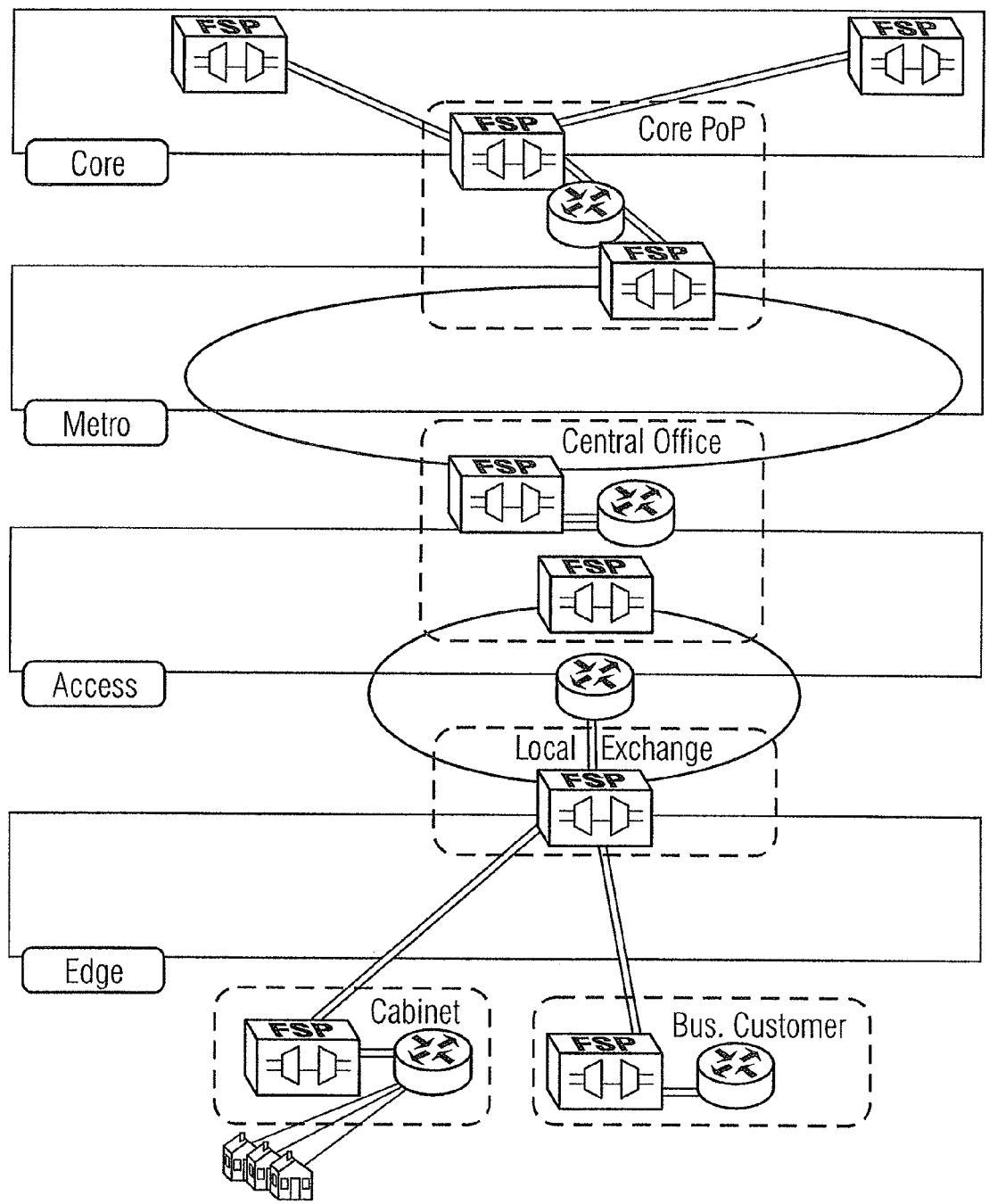
FIG. 1 shows an architecture of a hierarchical network according to the state of the art.
Figure 2:
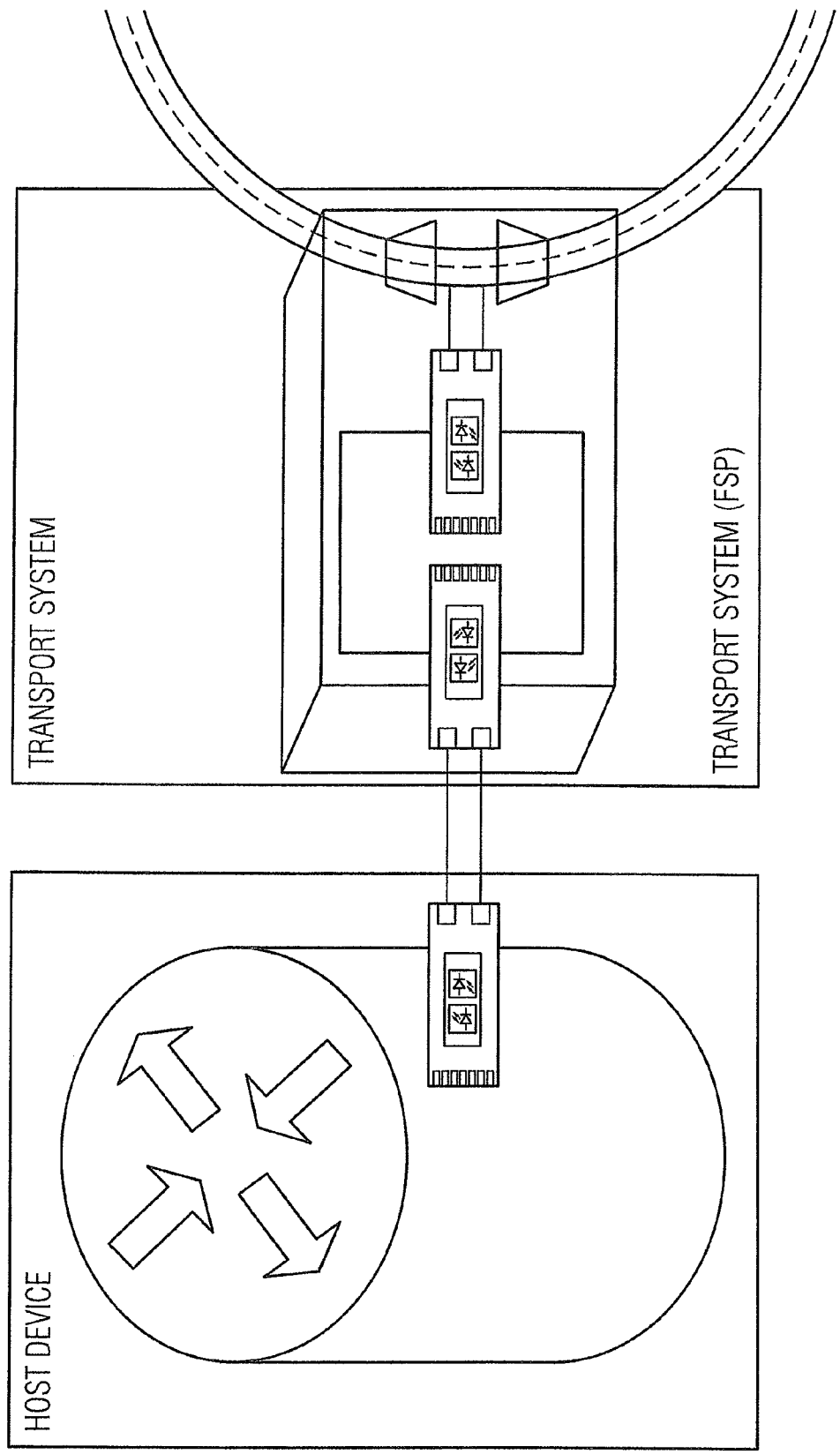
FIG. 2 shows an arrangement of a host device and a transport system according to the state of the art.
Figure 3:
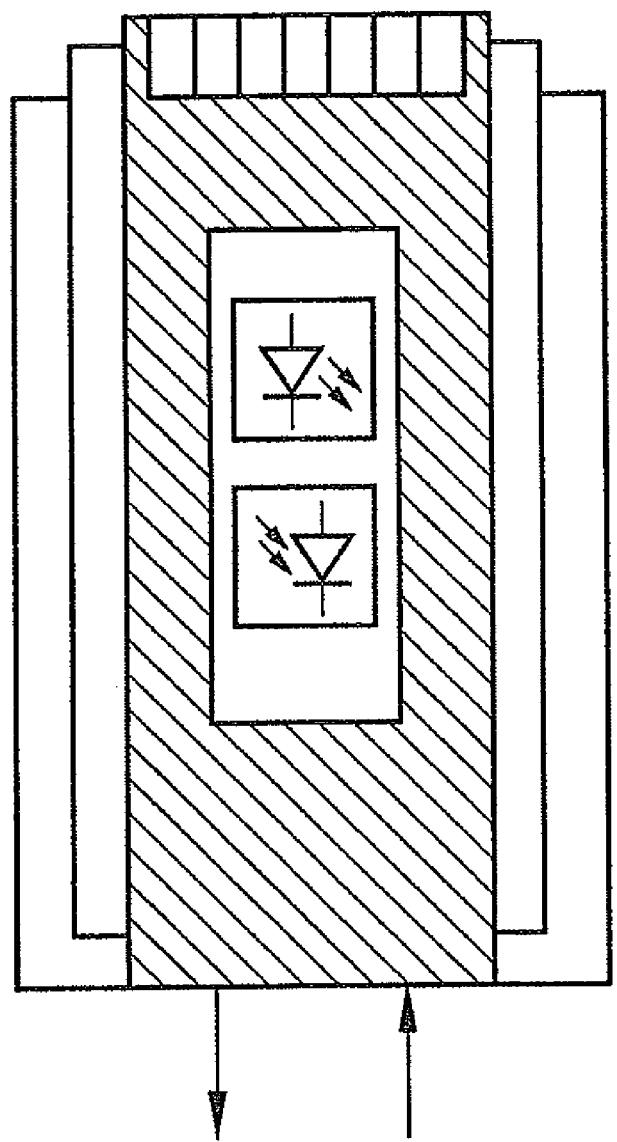
FIG. 3 shows a conventional FSP-module with a transceiver according to the state of the art.
Figure 4:
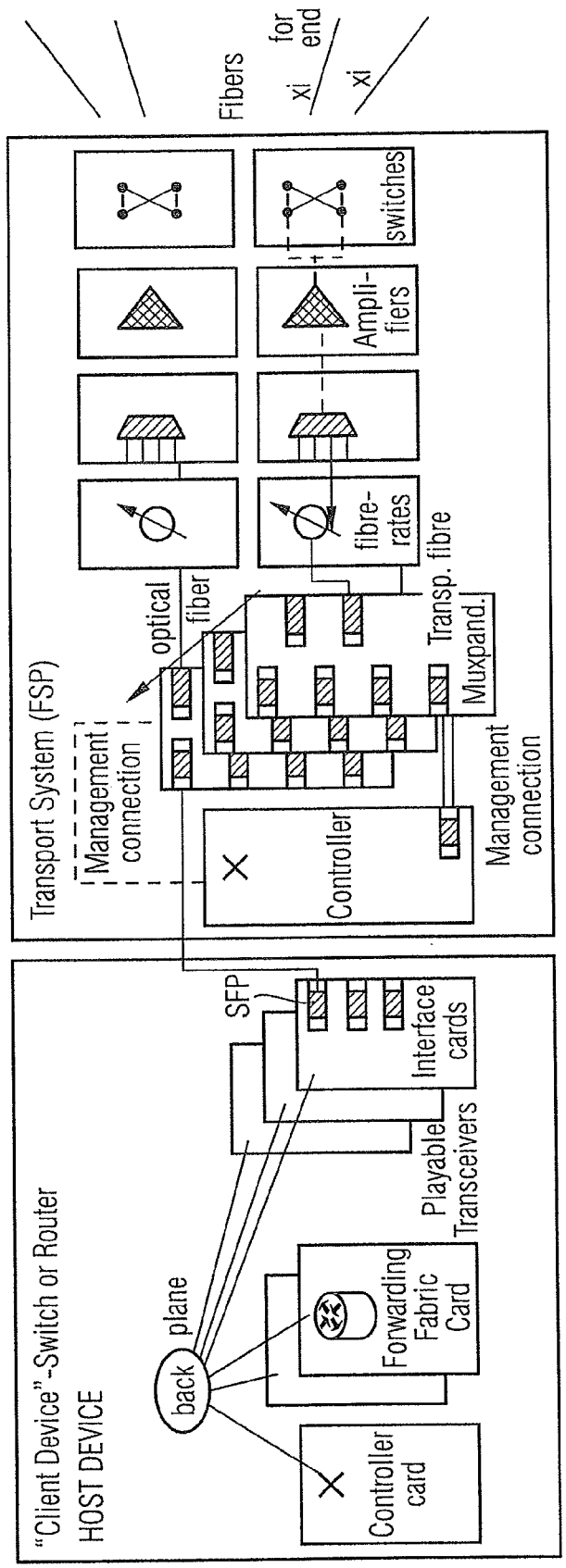
FIG. 4 shows an arrangement of a host device and a transport system according to the state of the art for illustrating the problem underlying the present invention.

A further major advantage of the optical network using the pluggable modules 1 according to the present invention resides in that the number of domain conversions between the electrical and optical domain is minimized. For the transport of data from one host device 2 to another host device 2 only one conversion on the near end side and one conversion on the far end side has to be performed. In contrast, the conventional network as shown in FIG. 4 needs three domain conversions on each side.

FIGS. 9A-9J show different embodiments of a pluggable module 1 according to the present invention. The pluggable module 1 comprises at least one optical interface 7 on the front side and an electrical interface 8 on the rear side. The electrical interface 8 comprises several electrical contacts for connecting the pluggable module 1 with the circuitry of a motherboard by inserting the pluggable module 1 into a corresponding cage 6 mounted on the mother board.

In the embodiment as shown in FIG. 9A, the pluggable module 1 comprises an unidirectional single amplifier 9 within the pluggable module 1.

The electrical interface 8 on the rear side of the pluggable module 1 can be formed by an I²C bus. On the front side of the pluggable module 1, there are attached two optical fibers 3-1, 3-2, one for receiving an optical signal and one for transmitting an optical signal.

In the embodiment as shown in FIG. 9B the pluggable module 1 comprises a bidirectional signal amplifier 10, wherein each optical fiber 3-1, 3-2 transports data in both directions.

In the embodiment as shown in FIG. 9C the pluggable module 1 comprises a blocking filter 11 which can be either unidirectional or bidirectional. The blocking filter 11 can, for example block signals with different wavelength 2 with the exception of a predetermined wave length. FIG. 9C shows a unidirectional blocking filter.

FIG. 9D shows a further embodiment of the pluggable module 1 according to the present invention. In the embodiment of FIG. 9D the pluggable module 1 comprises an OADM (Optical Add Drop Multiplexer)-filter 12 which is either unidirectional or bidirectional. FIG. 9D shows an unidirectional OADM-filter 12. As can be seen from FIG. 9D the pluggable module 1 has on the rear side not only an electrical interface 8 but also additional optical backplane plugs 13. In the given example, the module 1 comprises four optical backplane plugs 13. As can be seen from FIG. 9D the pluggable module 1 comprises six optical ports, i.e. four optical ports on the back side and two optical ports on the front side.

FIG. 9E shows a further embodiment of the pluggable module 1 according to the present invention. In the embodiment as shown in FIG. 9E the pluggable module 1 comprises a connector plug 14, which can be either unidirectional or bidirectional. FIG. 9E shows an unidirectional connector plug 14. The pluggable module 1 as shown in FIG. 9E connects the signals to the backplane of the host device 2 optically. To achieve this, the pluggable module 1 comprises optical backplane plugs 13-1, 13-2 as shown in FIG. 9E.

Figure 9H:
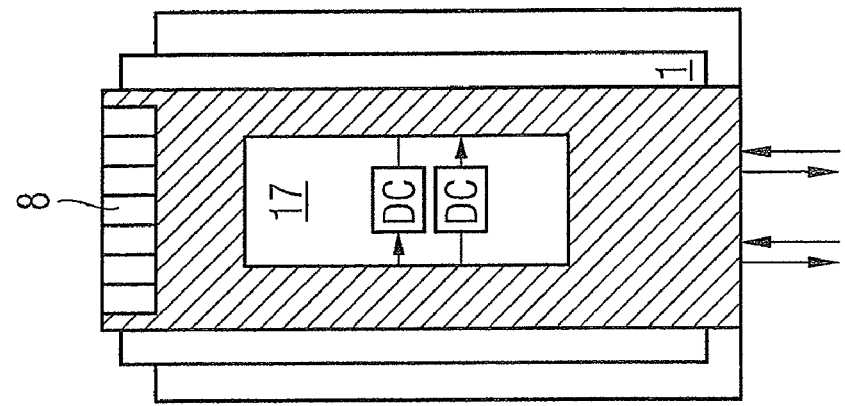
Figure 9G:
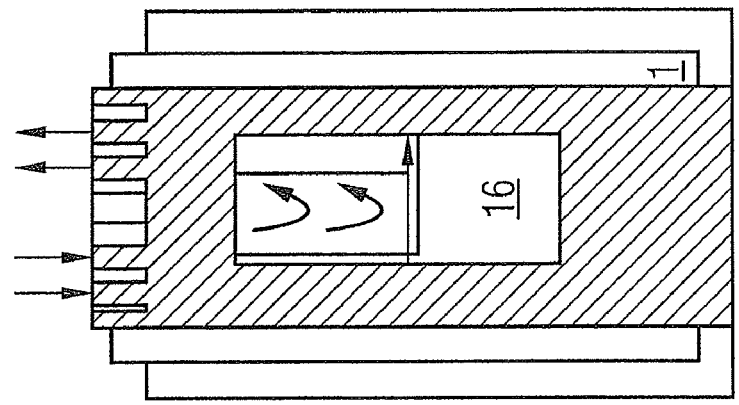
Figure 9F:
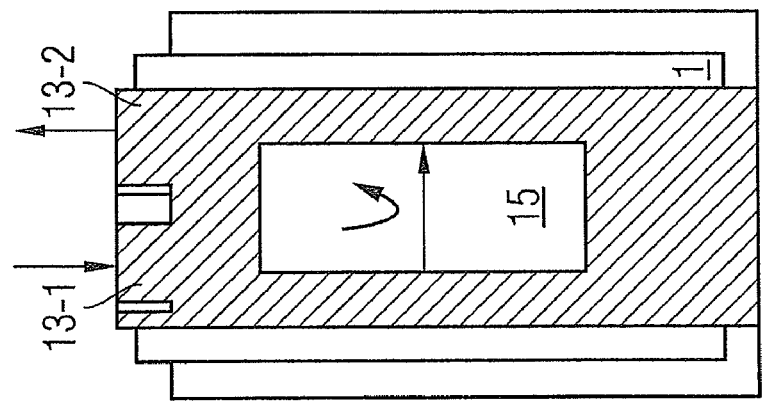

FIG. 9F shows a further embodiment of the pluggable module 1 according to the present invention. In this embodiment, the pluggable module 1 comprises a loop plug 15. The loop plug 15 can be either unidirectional or bidirectional. FIG. 9F shows a unidirectional loop plug. In the given embodiment as shown in FIG. 9F the pluggable module 1 does not comprise connectors on the front side. The loop plug 15 uses unused slots or connectors on the backside of the pluggable module 1. The loop can be either an electrical loop or an optical loop. In the example of FIG. 9F two backplane optical plugs 13-1, 13-2 form an optical loop.

FIG. 9G shows a further embodiment of the pluggable module 1 according to the present invention. In the shown embodiment the pluggable module 1 comprises a double-loop plug 16 which loops unused slots on the back side of the pluggable module 1. In the embodiment as shown in FIG. 9F no front connectors are provided. The embodiments as shown in FIG. 9F, 9A can be used for providing loops within a host device 2.

FIG. 9H shows a further embodiment of a pluggable module 1 according to the present invention. In the shown embodiment, the pluggable module 1 comprises a dispersion compensation plug 17. The dispersion compensation plug 17 can be either unidirectional or bidirectional. FIG. 9H shows a bidirectional dispersion compensation plug 17 within the pluggable module 1. The dispersion compensation unit DC can be, for example formed by a fiber bragg grating.

FIG. 9I shows a further embodiment of the pluggable module 1 according to the present invention. In the embodiment as shown in FIG. 9I the pluggable module 1 is formed by a variable optical attenuator VOA 18. The variable optical attenuator 18 can be either unidirectional or bidirectional. FIG. 9J shows a bidirectional variable optical attenuator 18.

FIG. 9J shows in a further embodiment of the pluggable module 1 according to the present invention. In the shown embodiment the pluggable module 1 comprises a power splitter 19. The power splitter 19 can be either unidirectional or bidirectional. FIG. 9J shows a unidirectional power splitter. In the given example of FIG. 9J the pluggable module 1 comprises six ports, for example port 1 may have 100%, port 5 x %, port 2 100−x % of the power and port 3, 6, 4 may have an identical signal but with other direction.

Figure 10:
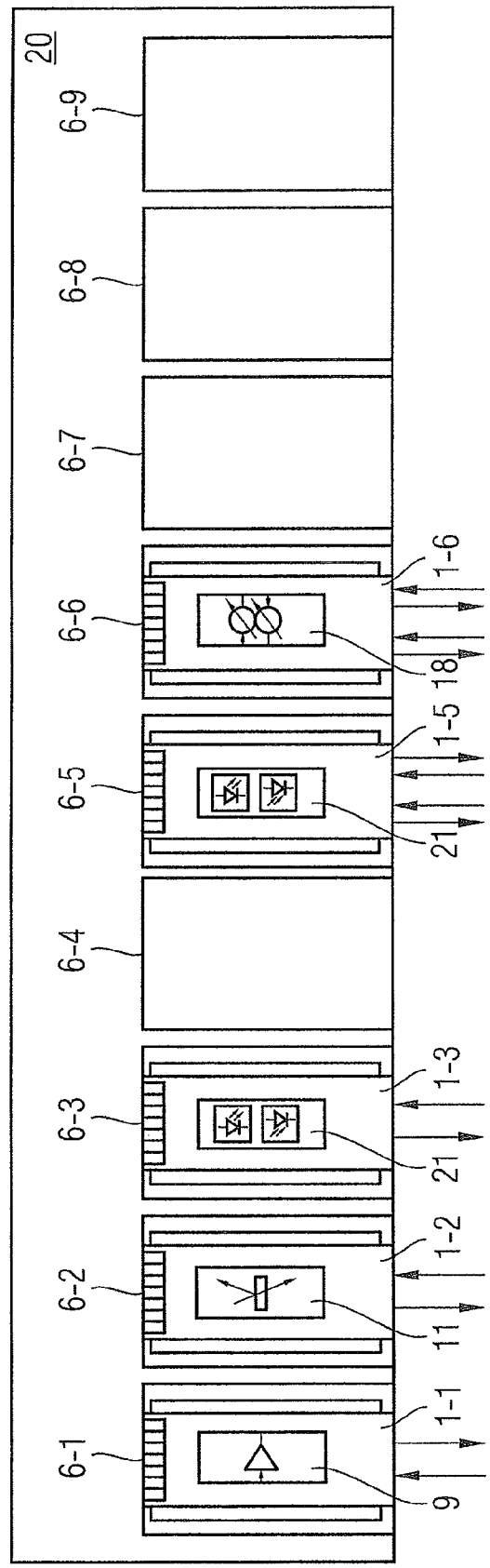
FIG. 10 shows an embodiment of an interface card as employed by a host device according to a possible embodiment of the present invention.

The host device 2 as shown in FIG. 6 may comprise in a possible embodiment an optical interface card 20 for several pluggable modules 1 according to the present invention as shown in FIG. 10. In the given example of FIG. 10, different pluggable modules 1 are plugged into a corresponding cage 6 of the interface card 20 of a host device 2. The interface card 20 comprises in the given example nine cages 6-1 to 6-9 each provided for receiving a corresponding pluggable module 1. In the given example of FIG. 10 the pluggable modules 1-1, 1-2, 1-3, 1-5 and 1-6 are plugged into the corresponding cages 6 of the interface card 20. In the given example the pluggable module 1-1 comprises an unidirectional amplifier 9, the second pluggable module 1-2 comprises a blocking filter 11 and the third pluggable module 1-3 is formed by a transceiver 21. The pluggable module 1-5 is also formed by a transceiver and the pluggable module 1-6 shown in FIG. 10 is formed by a variable optical attenuator VOA 18. The cages 6-4, 6-7, 6-8, 6-9 of the cartridge 20 are empty in the given example of FIG. 10.

Figure 11:
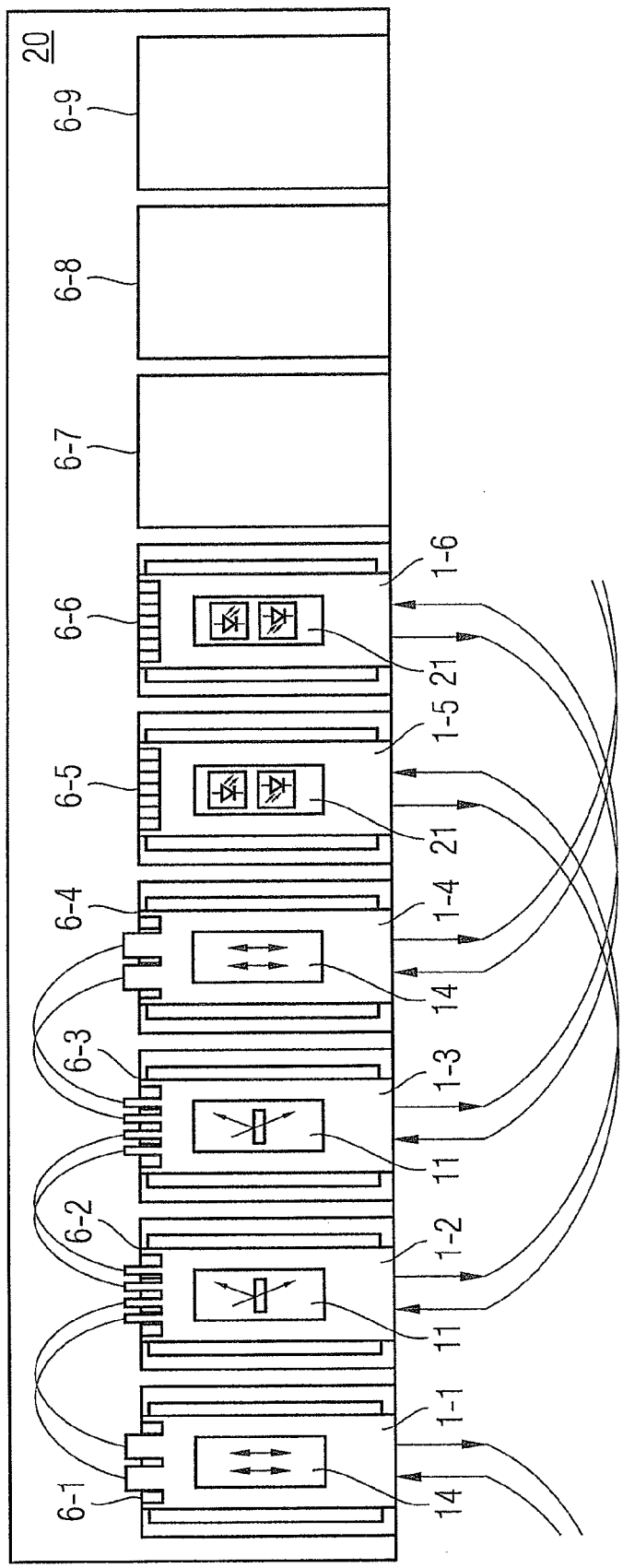
FIG. 11 shows an interface card of a host device with plugged in modules according to the present invention.

FIG. 11 shows a further example of a interface card 20 showing two wave lengths OADM. In the given example the first six cages 6-1 to 6-6 of the interface card 20 are occupied by plugged in pluggable modules 1-1 to 1-6. In the given example the first pluggable module 1-1 comprises a connector plug 14, the second pluggable module 1-2 comprises a blocking filter 11, the third pluggable module 1-3 comprises also a blocking filter 11, the fourth pluggable module 1-4 comprises a connector plug 14, the fifth pluggable module 1-5 is formed by a transceiver 21 and the sixth pluggable module 1-6 also comprises a transceiver 21.

Figure 12:
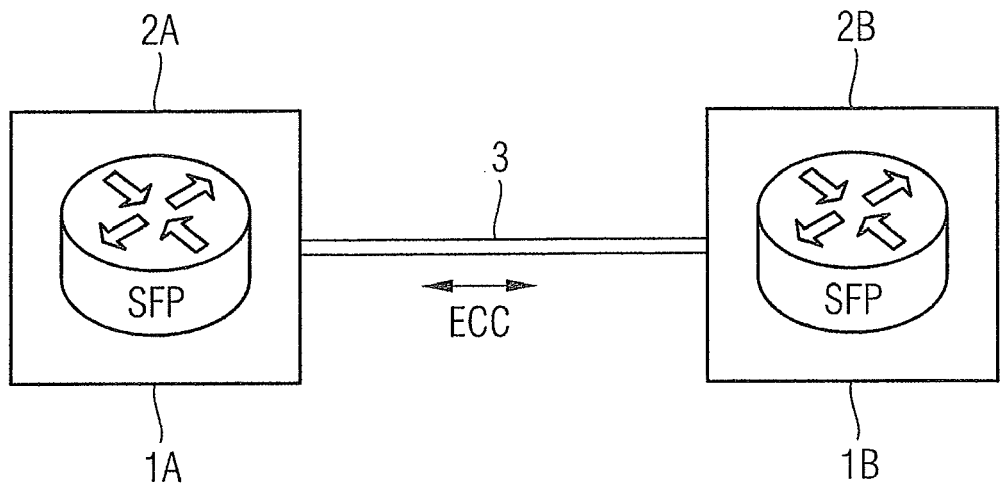
FIG. 12 shows a diagram for illustrating an embedded communication channel which is provided by a pluggable module according to an embodiment of the present invention.

In a preferred embodiment of the pluggable module 1 according to the present invention, the pluggable module 1 comprises an embedded communication channel ECC as illustrated by FIG. 12. The embedded communication channel ECC is provided between two pluggable modules 1A, 1B and is provided for exchanging management data, administrative data and performance monitoring data between the near end pluggable module 1A and a far end pluggable module 1B. In a possible embodiment the embedded communication channel ECC is implemented at a physical layer. The embedded communication channel ECC can be provided by amplitude shift keying (ASK), frequency shift keying (FSK) or phase shift keying (PSK). In a possible embodiment the embedded communication channel ECC is provided by side band modulation of a data signal of transported data. In a possible embodiment the data signal is pulse amplitude modulated.

In a further embodiment the embedded communication channel ECC between the pluggable modules 1A, 1B is implemented at a protocol layer. In a possible embodiment the embedded communication channel ECC uses a bandwidth not occupied by a transport protocol for exchanging data between the near end pluggable module 1A and a far end pluggable module 1B.

In a possible embodiment the embedded communication channel ECC is implemented on a proprietary overhead that is generated on top of a transport protocol.

In a further embodiment the embedded communication channel ECC can be implemented based on the overhead of a transport protocol, such as idle data patterns in inter-frame gaps.

In a further embodiment the embedded communication channel ECC can be implemented within a protocol layer, such as an Ethernet protocol. The embedded communication channel ECC can use existing protocol overheads or space in inter-frame gaps which can be implemented inside a protocol layer, such as EFM.

The mapping/demapping of data within the embedded communication channel ECC is performed within the pluggable module 1A, 1B.

The purpose of the provided embedded communication channel ECC is to read performance monitoring data from the far end side, write PM-data to the far end side and to perform topology detection within the network of pluggable modules 1. The embedded communication channel ECC can be provided to read communication data from the far end side and to report to an internal controller of the near end pluggable module 1. With the embedded communication channel ECC it is further possible to write configuration data to the far end pluggable module controller and to allow communication between a near end host device 2A and a far end host device 2B as shown in FIG. 11.

The provision of an embedded communication channel ECC allows remote reporting of diagnostic parameters, such as DMI. Furthermore, it is possible to make remote diagnostics parameters permanently available at a remote side, for example power local, power remote. By using standard SFF 8472 digital diagnostics I/F, it is possible to latch remote data, i.e. store the data in a memory of the pluggable module 1.

There are two main possibilities for implementation of the embedded communication channel ECC. In a physical layer implementation of the embedded communication channel ECC, for example a pilot tone can be used. By using, for example a slow AM modulation scheme (10%, KHz range) available diagnostic I/F data can be imprinted on the embedded communication channel ECC.

In an alternative embodiment, the embedded communication channel ECC can be implemented on a protocol layer. For example, the embedded communication channel ECC can be provided on top of a service protocol. In a possible embodiment, a high speed capable integrated circuit can be provided in a data path to imprint the embedded communication channel ECC. Imprinting of the embedded communication channel ECC can, for example use of inter-frame gaps for creation of an overhead OH. The available digital diagnostic I/F data can be imprinted or transferred on the embedded communication channel ECC.

Figure 13:
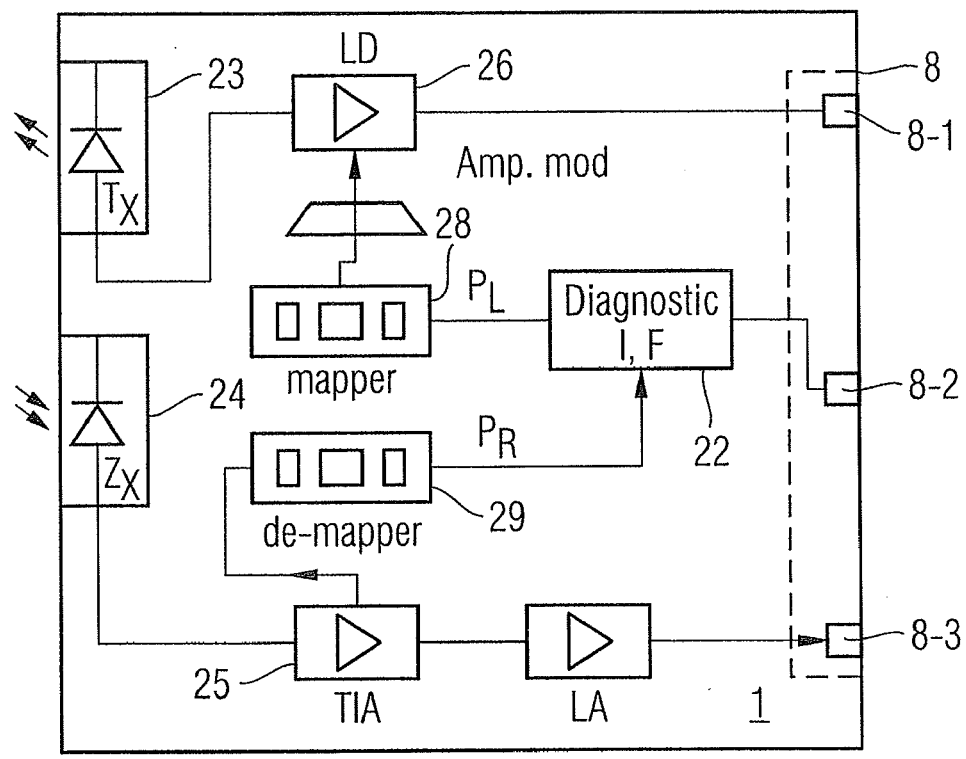
FIG. 13 shows a block diagram of a possible embodiment of a pluggable module according to the present invention.

FIG. 13 shows a possible embodiment for the pluggable module 1 comprising an embedded communication channel ECC. In the shown embodiment, the pluggable module 1 comprises a diagnostic unit 22 to receive local performance data and electronic components within the pluggable module 1. These electronic components comprise in the given example a transmission diode 23, a receiving diode 24, a transimpedance amplifier TIA 25, a laser driver 26 and a limiting or linear amplifier 27. On the backside of the pluggable module 1 the electrical interface 8 comprises a data transmission interface 8-1, an electrical reporting interface 8-2 and for the reception data path an electrical data reception interface 8-3. Furthermore, the pluggable module 1 comprises a mapping unit 28 which controls the laser driver 26 depending on local performance data received from the diagnostic unit 22 to transfer the performance data via the provided embedded communication channel ECC to a remote pluggable module 1.

As can be seen from FIG. 13, the pluggable module 1 further comprises a demapping unit 29 for storing performance data extracted from the embedded communication channel ECC in a memory of the diagnostic unit 22. The performance data can be extracted, for example at the transimpedance amplifier 25 and the embedded communication channel ECC can be provided by side band modulation of a data signal of the transported data stream. The diagnostic unit 22 receives local performance data from the electronic components 23, 24, 25, 26, 27, such as temperature T or power consumption P. In a possible embodiment, the diagnostic unit 22 reports the received local (near end) performance data and the received remote (far end) performance data transported via the embedded communication channel ECC via the electrical interface 8-2 to a controlling device of the host device 2 into which the pluggable module 1 is inserted. The electrical interface 8-2 can be formed in a possible embodiment by an I²C bus. In a possible embodiment, the performance data extracted at the transimpedance amplifier TIA comprises SFF 8472-performance parameters. In a possible embodiment, the diagnostic unit 22 comprises a memory for storing local performance data of the pluggable module 1 as well as the received and extracted performance data of remote pluggable modules.

Figure 14:
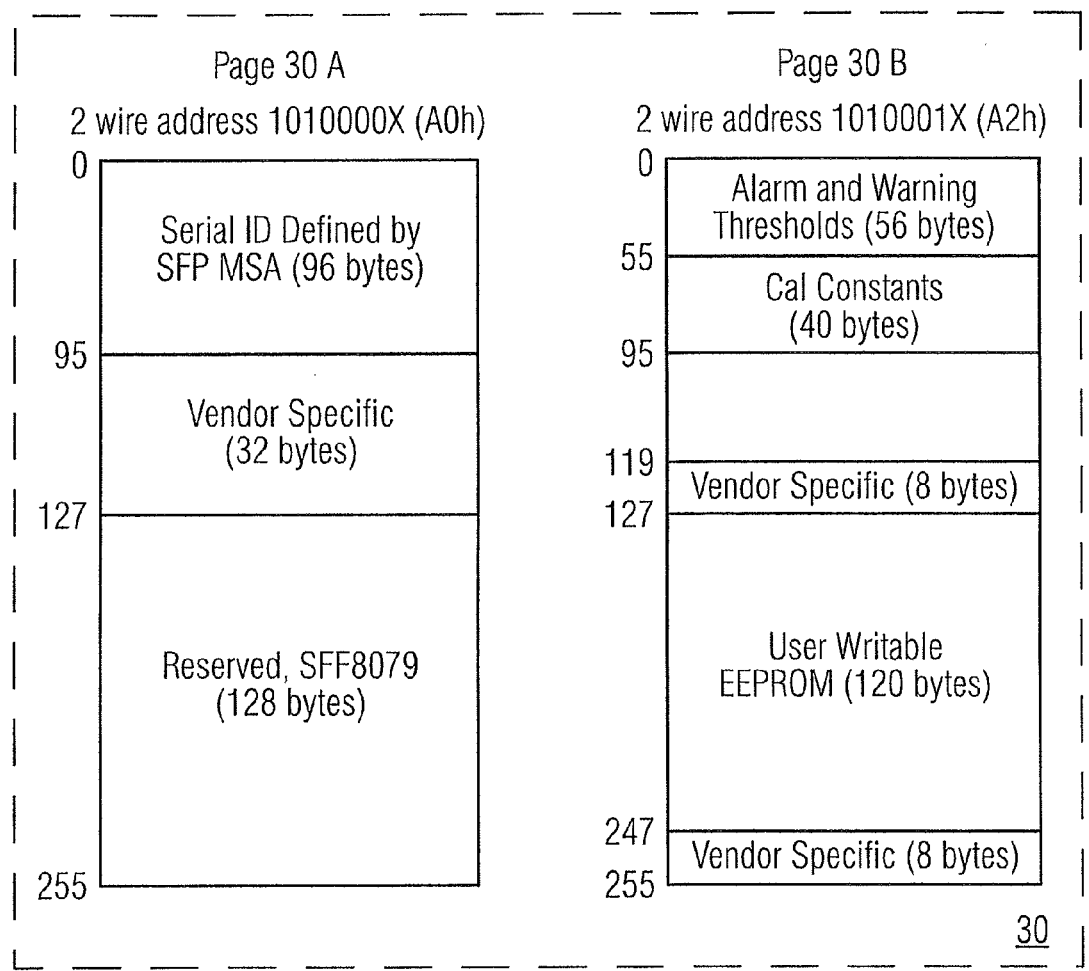
FIG. 14 shows a data structure of a memory within a pluggable module according to a possible embodiment of the present invention.

FIG. 14 shows schematically a memory content of a memory 30 within the diagnostic unit 22 as shown in FIG. 13. In the shown embodiment, the memory 30 is a SSF 8472-memory having a page 30A and a page 30B. As can be seen from FIG. 14, in the SSF 8472-memory unallocated bytes on page 30B are used for exchanging DMI (digital monitoring interface) performance data with a far end pluggable module 1. This memory space can be used for transferring data from the diagnostic unit 22 to the respective host device 2.

FIG. 15 shows the memory space page 30B for storing real time diagnostic interface data in more detail. Data bytes 96-105 are used for local near end parameter data. As can be seen from FIG. 15 data bytes 106-109 are unallocated data which can be used for transferring data via the embedded communication channel ECC to a far end pluggable module. In a possible embodiment, the parameter data is refreshed in a fixed time period interval, such as every five seconds.

As can be seen from FIG. 13, the mapping and demapping units 28, 29 are connected to a SFF 8472-diagnostic unit. The near end SSF 8472-data is read and written into the embedded communication channel ECC by the mapping unit 28. The embedded communication channel ECC is read and the far end SFF 8472-parameter data is extracted and written to the near end SFF 8472-unit 22. The data is written to a diagnostic SSF 8472-unit 22 which supports SSF 8472 programming pages, so that address space extensions can be avoided to prevent adaptions of the hardware and software of the host device 2. To meet space constraints within the SSF 8472-address space a proprietary TDM-mapping scheme can be supported to map such data sets into the address space.

In a possible embodiment of the pluggable module 1 according to the present invention, the pluggable module 1 performs near end and far end bidirectional performance monitoring.

FIGS. 16A, 16B show embodiments employing parallel processing using SERDES (serial/deserializer). FIGS. 16C, 16D show embodiments of the pluggable module 1 employing serial processing using high speed FPGA-interfaces. As can be seen from FIG. 16A, a SERDES (serial/deserializer) 31 is provided for supplying data from a transmit data path to data processing circuit 32 such as a field programmable gate array. The data processing circuit 32 can also be formed by an ASIC, EPLD or CPLD.

A further SERDES (serial/deserializer) 33 is provided for supplying data from a reception data path of said pluggable module 1 to the FPGA 32.

The digital performance monitoring is provided for observing data streams. The SERDES 31, 33 are provided for parallizing a high speed signal into a number of low speed data streams.

In the embodiments shown in FIGS. 16C, 16D the SERDES 31, 33 are incorporated in the FPGA 32. In the embodiment shown in FIG. 16A the SERDES 31, 33 are provided within the data path and have high speed in- and out-interfaces for the local speed data streams. In the embodiment as shown in FIG. 16B the SERDES 31 has a high speed in-interface for a signal which is forwarded as a low speed data stream to the FPGA 32. The FPGA 32 as shown in FIGS. 16A, 16B is provided for performing performance monitoring. The FPGA 32 is connected to the diagnostic unit 22 of the pluggable module 1. In a possible embodiment, the FPGA 32 increments at least one performance counter provided in a memory 30 of the diagnostic unit 22 depending on a measured performance indicator. In a possible embodiment, the performance indicator can be formed by a BER (bit error rate), a CV (coding violation) or by frame drops.

Figure 17:
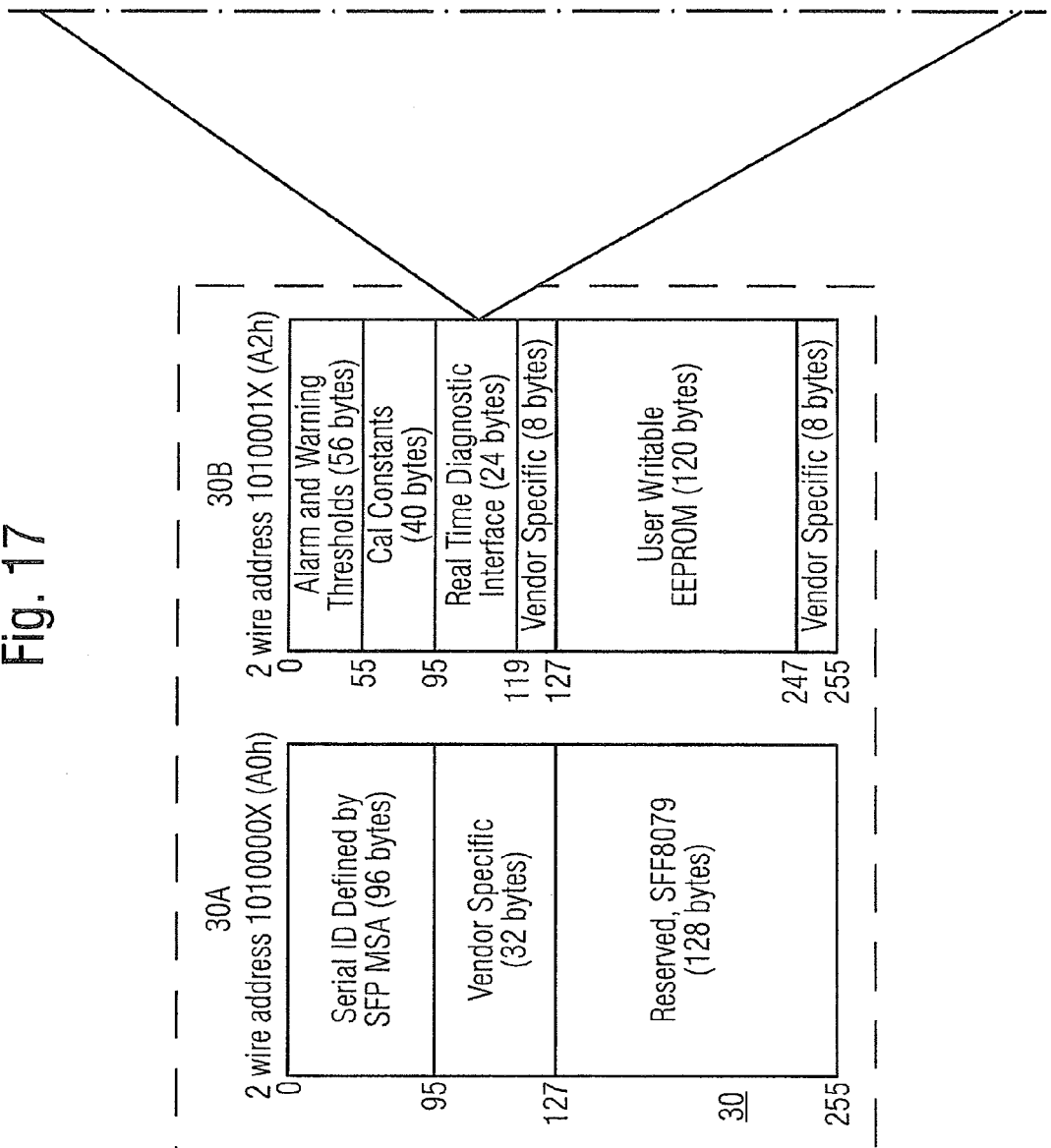
Figure 17B:
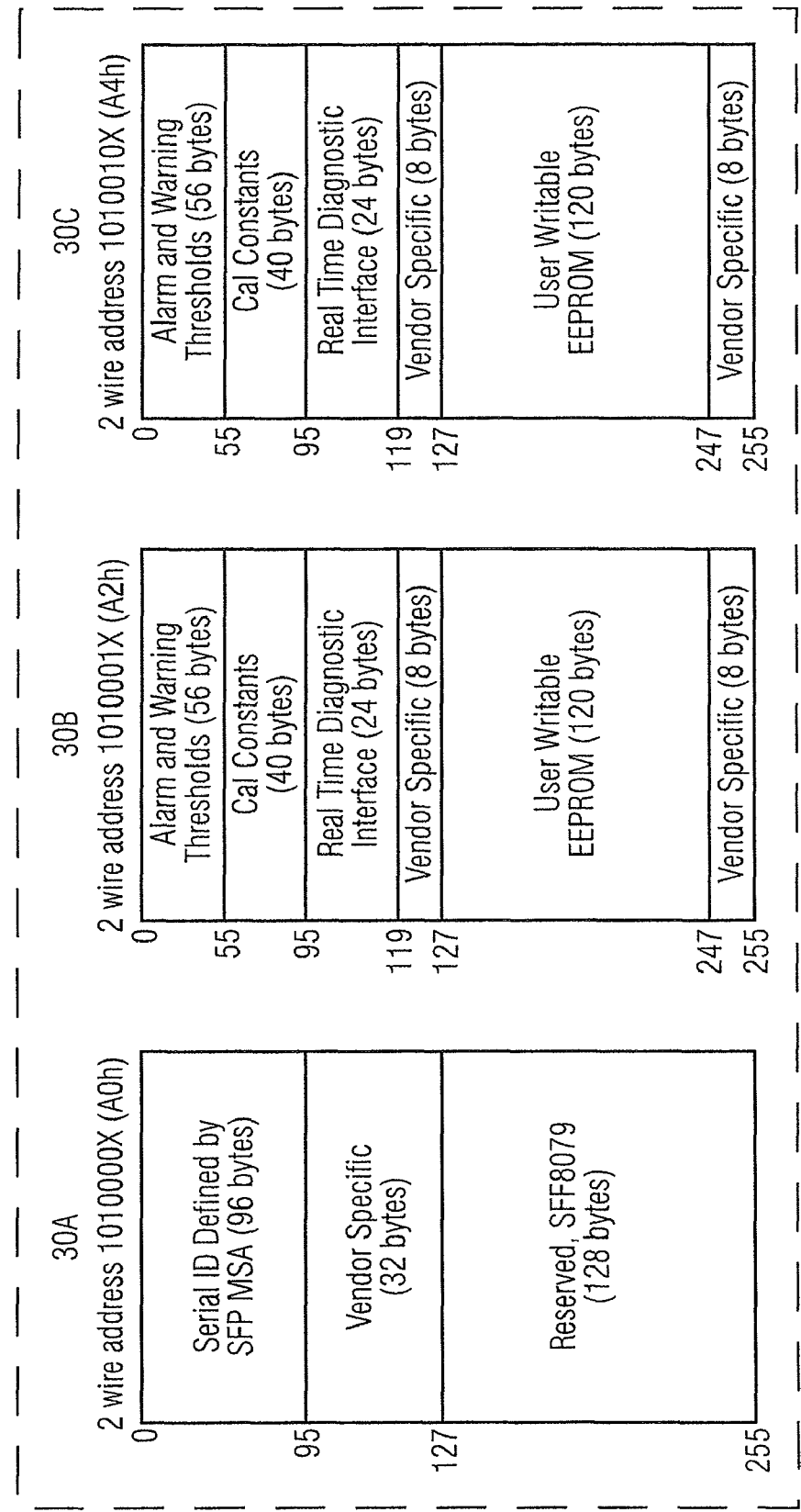

FIGS. 17, 17A, 17B show different possibilities to read out data using a memory 30 within the diagnostic unit 22. In the embodiment as illustrated by FIGS. 17 and 17A, free memory space of the memory 30 as shown in FIG. 14 is used to read out data.

In the embodiment as illustrated in FIG. 17B, an additional programming page 30C is provided to read out performance data.

In a possible embodiment, the memory 30 within the diagnostic unit 22 is a SFF 8472-memory comprising unallocated bytes used for an ES (error seconds), a SES (severe error seconds) a UAS (Unavailable Seconds) and a BER (Bit Error Rate) performance counter.

Figure 18A:
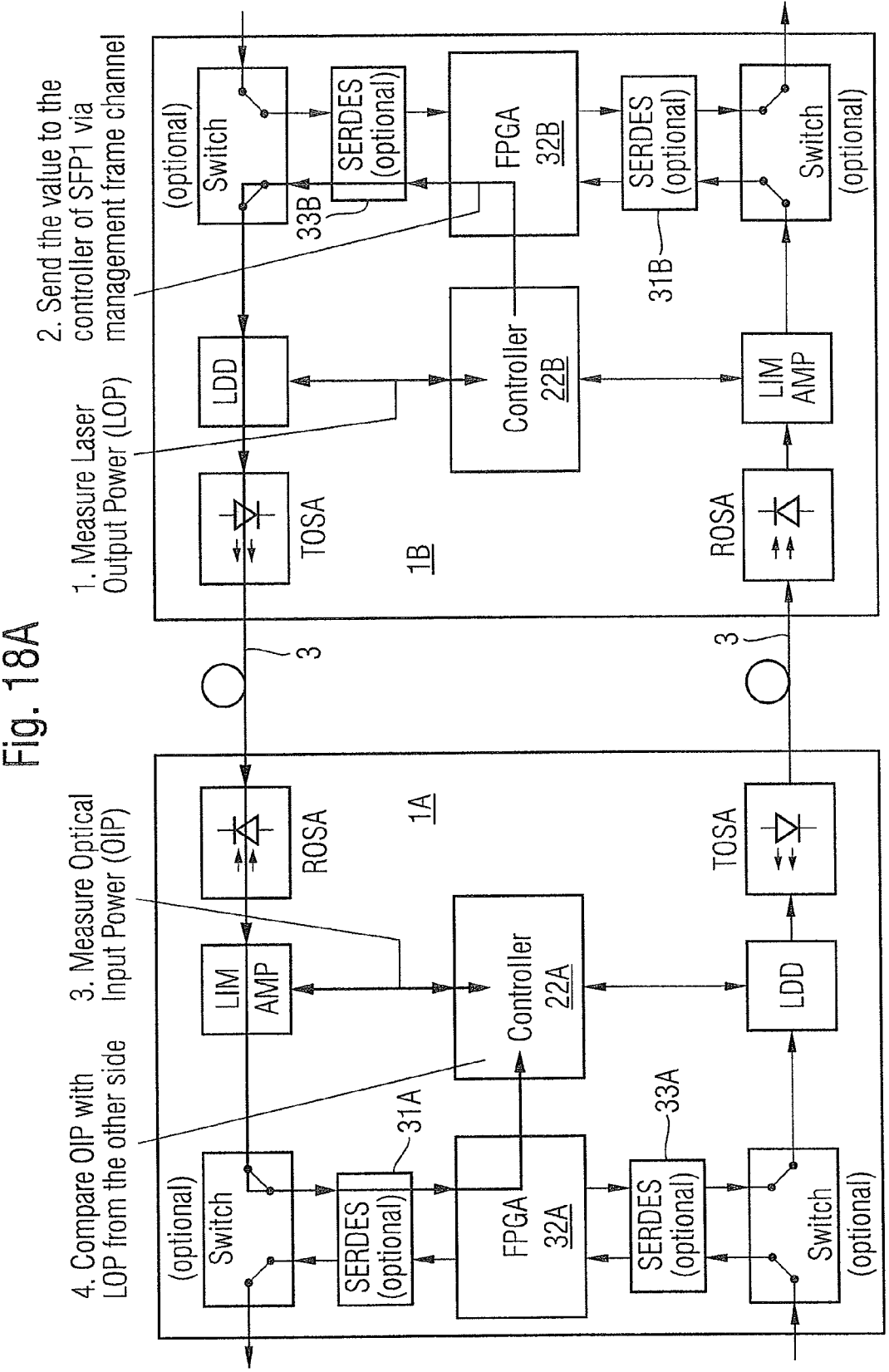
FIGS. 18A, 18B illustrate possibilities of line attenuation measurements performed by the pluggable module according to the present invention.

FIG. 18A illustrates a possibility of a line attenuation measurement which can be performed as performance monitoring by the pluggable module 1 according to the present invention. In the shown embodiment, the communication is performed via a management channel inside of a frame. First, the controller 22B measures the laser output power in the given example. Then the FPGA 32B of the pluggable module 1B sends the measured value of the controller 22B via a management frame channel to the other pluggable module 1A. In a further step, the controller 22A of the pluggable module 1A measures an optical input power (OIP) and compares then the optical input power with the laser output power (LOP) from the other side.

Figure 18B:
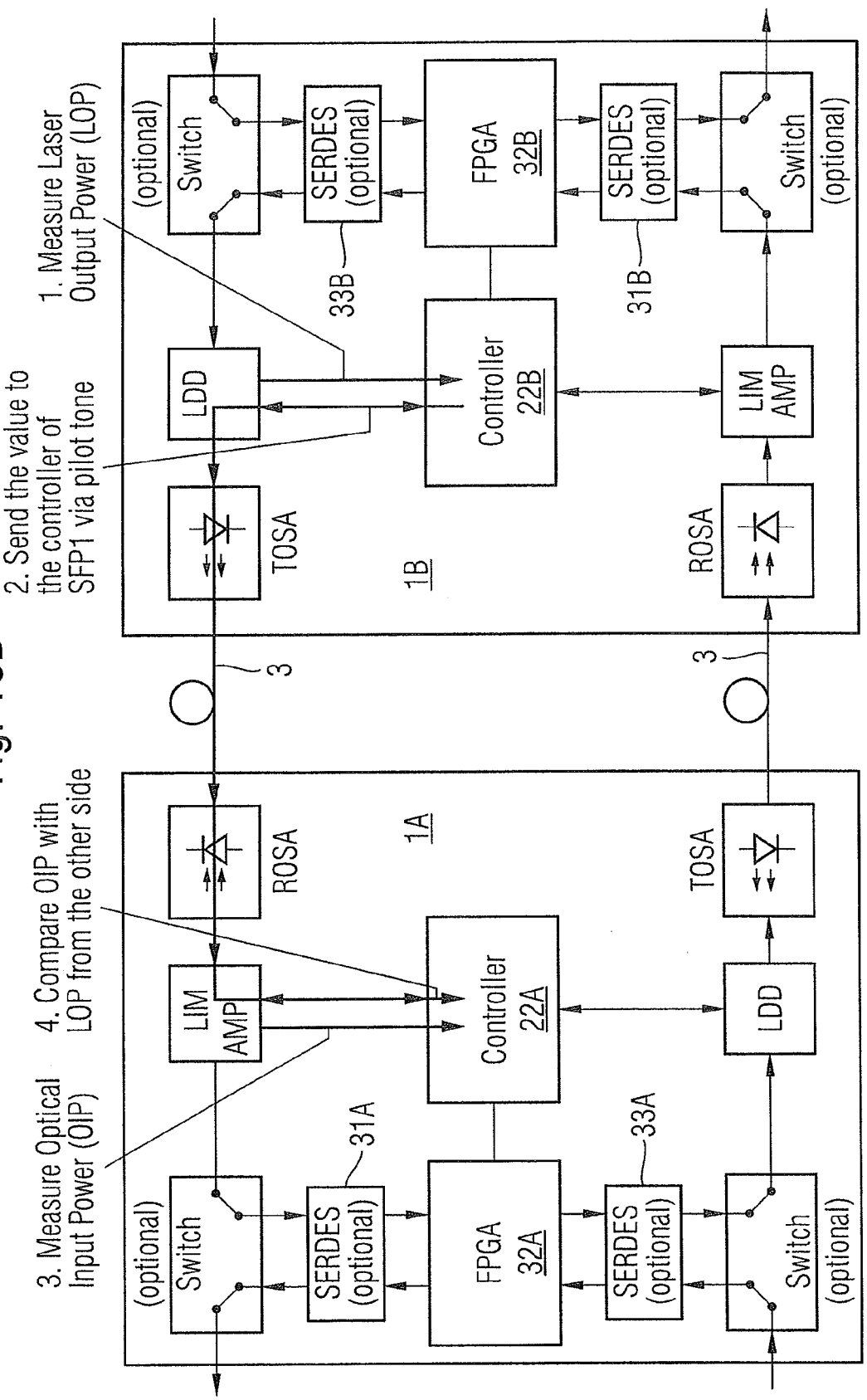

FIG. 18B shows a further possible embodiment for measuring a line attenuation. First, a laser output power (LOP) is measured. Then, the pluggable module 1B sends the measured value of the laser output power (LOP) to the other pluggable module 1A. The pluggable module 1A compares the received value with its optical input power so that the local FPGA 32A can analyze the attenuation of the link. For monitoring the line attenuation, the start value of attenuation (at the start-up of the line first time) can be compared with the current measurement value of attenuation. Now it is possible to calculate a line attenuation for a time and to monitor if sudden changes occur. In an embodiment, a communication is performed via a pilot tone. In an alternative embodiment, the communication is performed via a management channel inside a frame.

Figure 19:
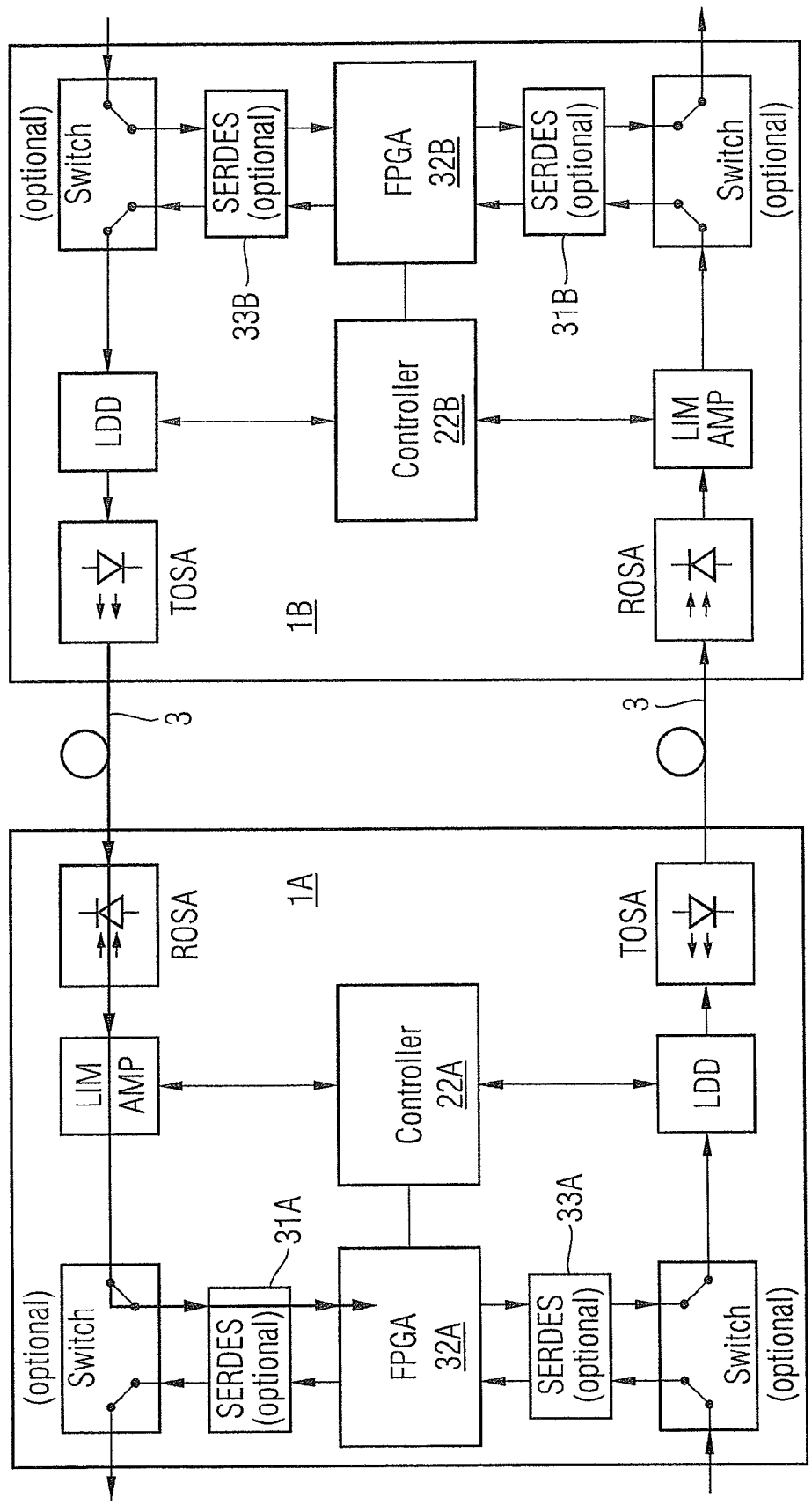
FIGS. 19, 20 illustrate a performance monitoring as performed by the pluggable module according to the present invention.
Figure 20:
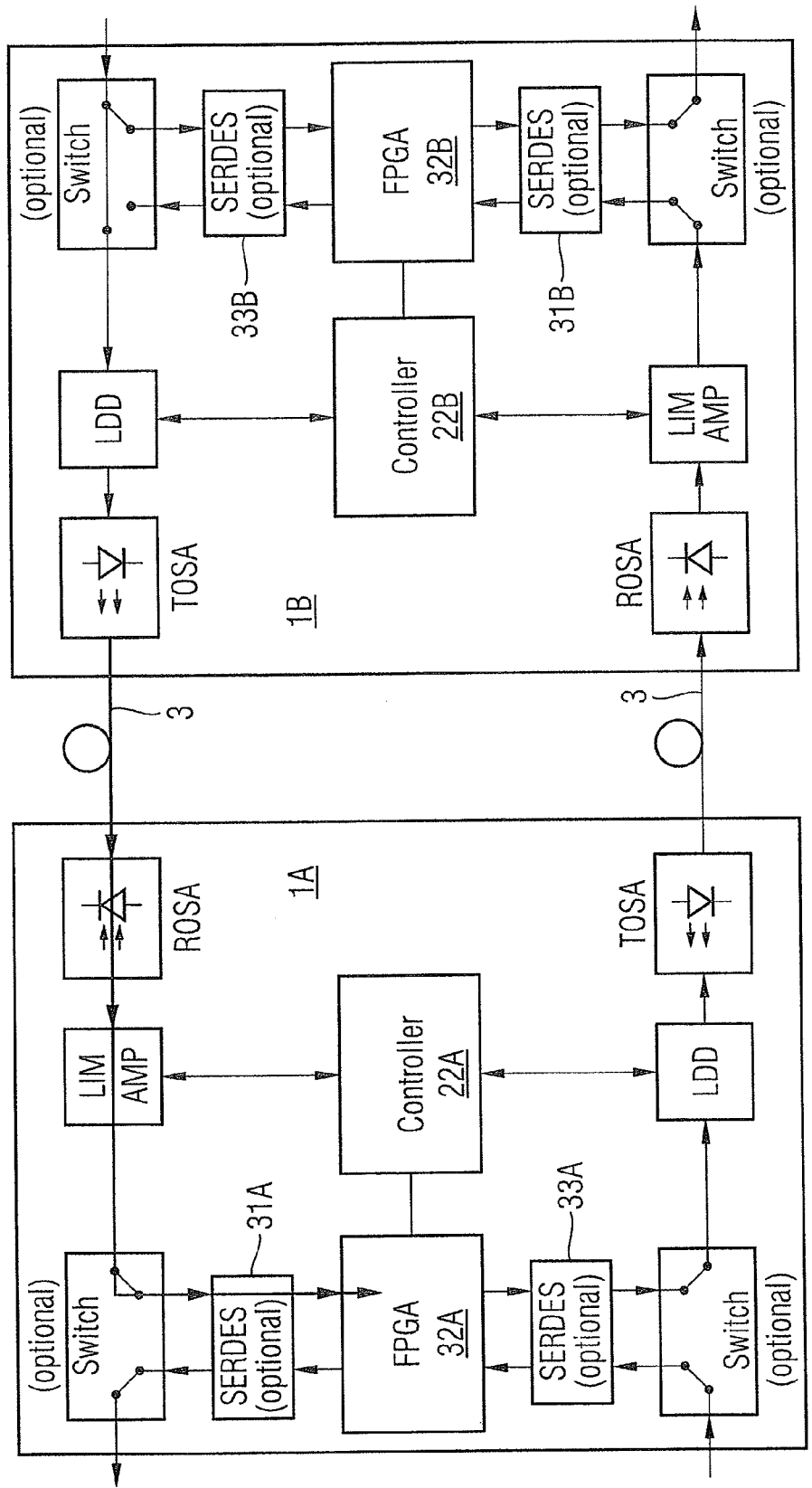

FIGS. 19, 20 illustrate performance monitoring by a pluggable module 1 according to the present invention. The FPGA 32 is provided in the data path for monitoring the data path. The FPGA 32B detects with the help of SERDES various frame properties, such as running disparity, simple disparity, code error or a disparity error.

Figure 21:
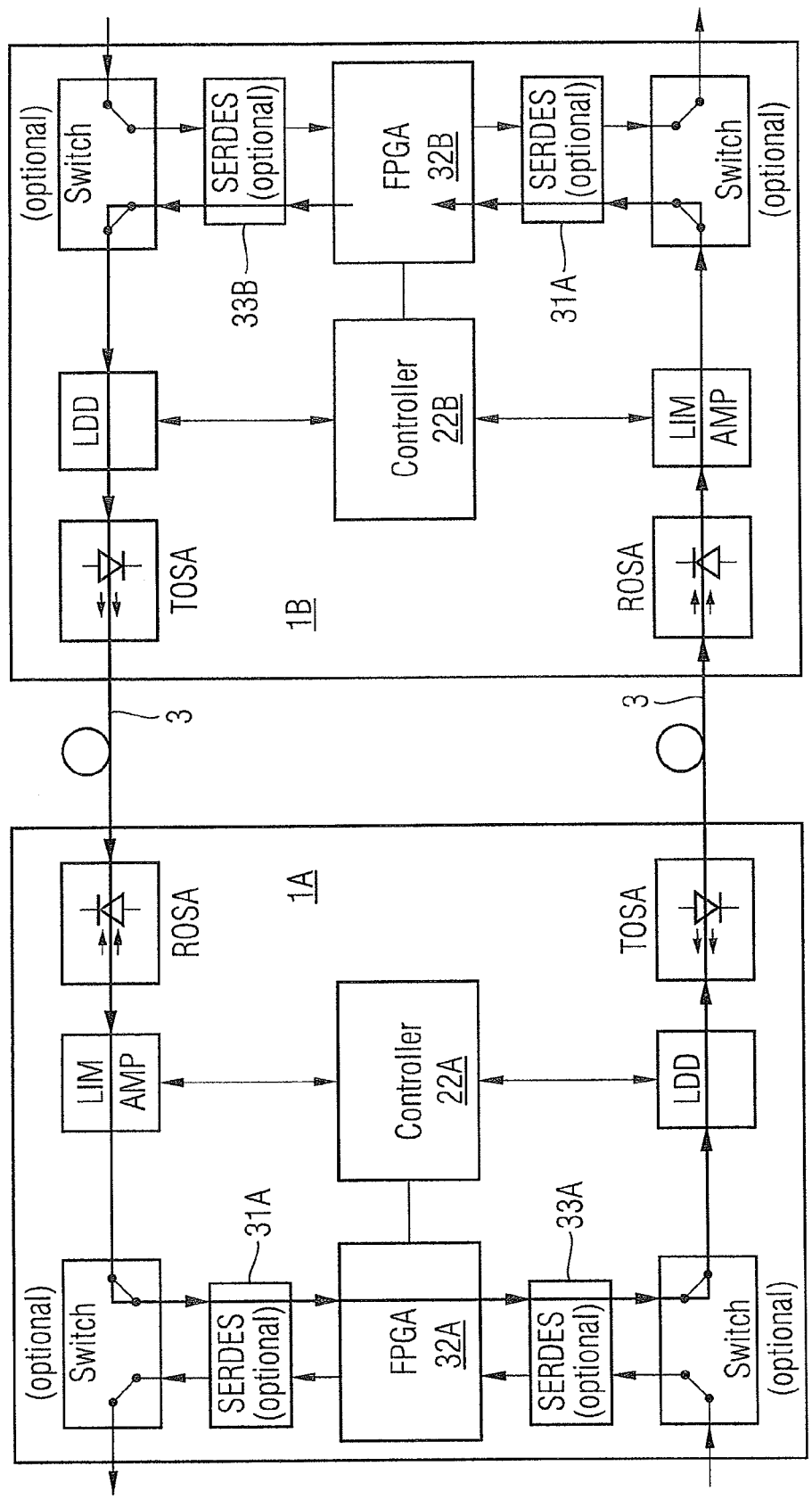
FIG. 21 illustrates a PRBS (Pseudo Random Bit Sequence)-test as performed by a pluggable module according to the present invention.

FIG. 21 illustrates a PRBS (Pseudo Random Bit Sequence) test. In a possible embodiment, the line is analyzed by variation of a PRBS sequence, wherein two various operations can be provided. In a PRBS-loop test as illustrated by FIG. 21, the FPGA 32B of pluggable module 1B sends a PRBS-sequence to the FPGA 32A of the pluggable module 1A. The FPGA 32A of the pluggable module 1A loops the signal. The FPGA 32B of the pluggable module 1B then receives its own PRBS-sequence and can analyze it and can calculate a line quality.

Figure 22:
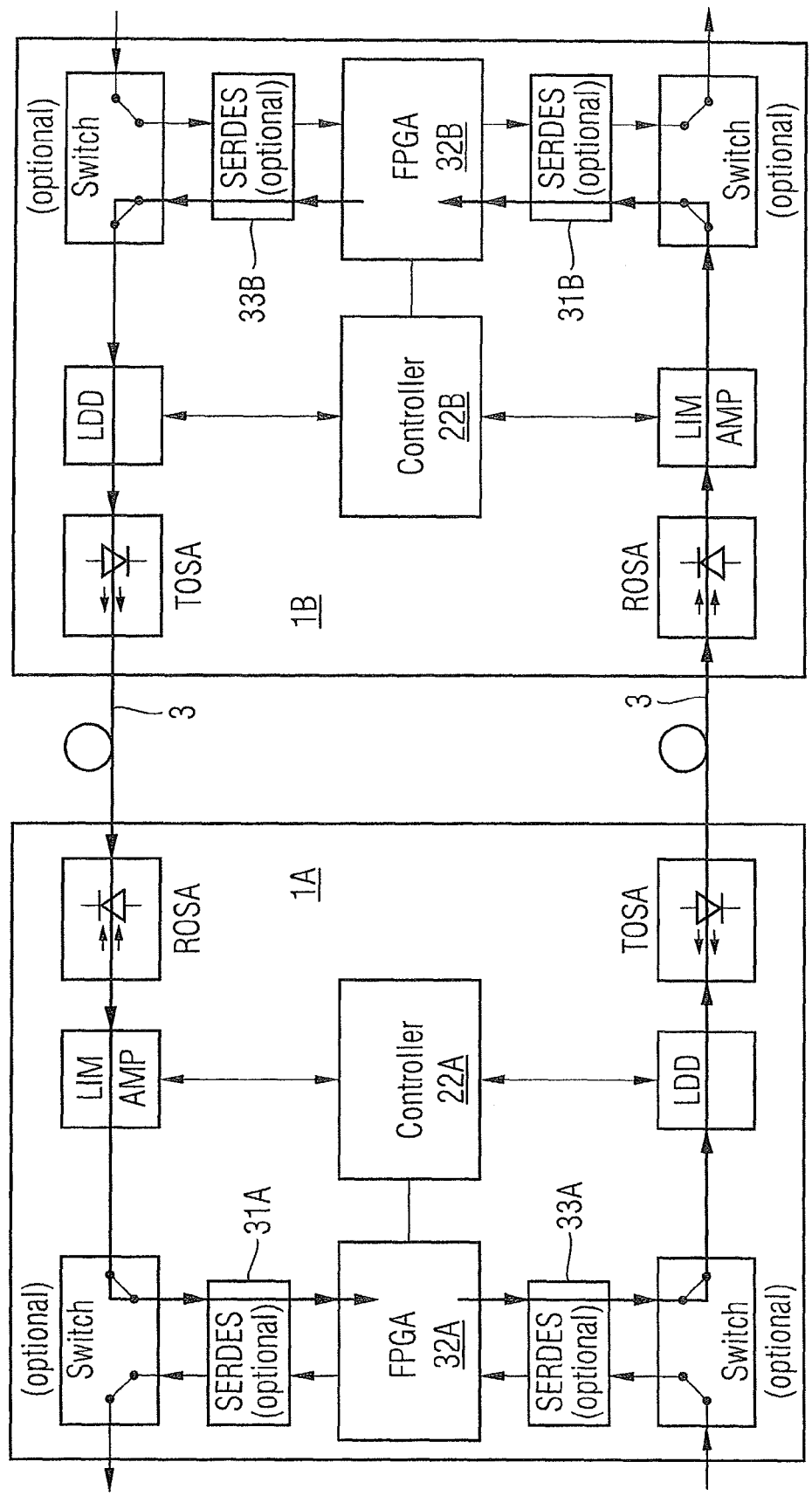
FIG. 22 shows a variant of a PRBS (Pseudo Random Bit Sequence)-test as performed by a pluggable module according to the present invention.

FIG. 22 illustrates a second operation variant for analyzing a line by variation of a PRBS-sequence. In this variant, a separate PRBS-test is performed, i.e. a PRBS-test is performed for each separate line. The FPGA 32A of pluggable module 1A sends a PRBS-sequence to the FPGA 32B of the other pluggable module 1B. Then, the FPGA 32B of pluggable module 1B analyzes the received PRBS-sequence. The same procedure is possible the other way around, i.e. the FPGA 32B of the pluggable module 1B sends the PRBS-sequence to the FPGA 32A of the pluggable module 1A. This is provided for measurements of a line delay (line length). In a line delay loop test FPGA 32B of pluggable module 1B sends a special identifier to the FPGA 32A of the pluggable module 1A. The FPGA 32A of the pluggable module 1A loops the received signal. Then, the FPGA 32B of the second pluggable module 1B receives the special identifier after a line delay time so that it can be analyzed and calculates the line length.

Figure 23:
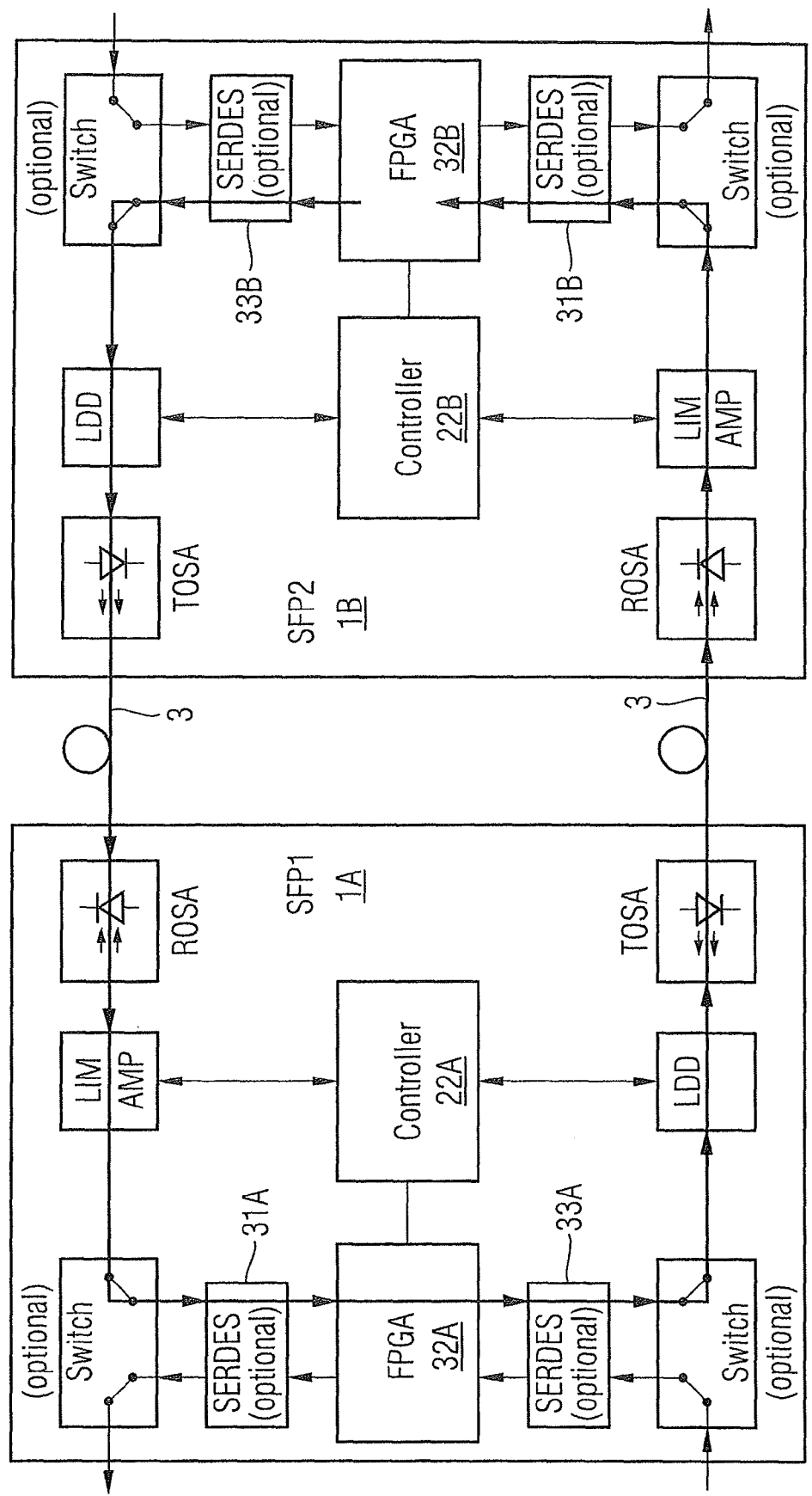
FIG. 23 shows a latency measurement as performed by the pluggable module according to the present invention.

In a possible embodiment, the pluggable module 1 performs a latency measurement as shown in FIG. 23 of a latency for transporting data from the pluggable module 1 to a far end pluggable module 1'. The measurement can be performed dynamically and without affecting data transmission. In a possible embodiment, the near end pluggable module writes a byte x at a time T1 into a signal overhead the far end pluggable module 1 extracts the byte X and writes it to an overhead byte Y at the far end transmitter. The near end pluggable module reads the received byte Y by extracting the T1-time stamp at the time T2. The total delay time is T2−T1. Accordingly, the measured one way latency is T=0,5*(T2−T1).

In a possible embodiment, the latency T is written to the SFF 8472. In an embodiment, the measurement procedure is performed symmetrically, i.e. latency T is available as a dynamical in-service measured parameter at the near end side and at the far end side.

The measurement of the latency T is necessary to fulfil service level agreements (SLA). The latency T sometimes causes protocol buffering to manage protocol throughput, for example in a fiber channel protocol.

In a further embodiment of the pluggable module 1 according to the present invention, the pluggable module 1 performs a link test. A link test is an initialization procedure that takes place before data transmission between host devices 2 is established. A received latency parameter at the far end pluggable module can be evaluated as a link test indication. The purpose of the link test is that it allows to set up and to verify an optical link between two pluggable modules 1 independently from the availability of host data.

In an embodiment of the pluggable module 1 according to the present invention, the pluggable module 1 performs a protocol mapping to transport protocols.

The protocol mapping can comprise payload mapping or overhead mapping. The transport protocols comprise an OTH, Ethernet, SDH or Sonet data transport protocol. In a possible embodiment, the protocol mapping performed by the pluggable module 1 is configurable. In a possible embodiment, the transport protocols comprise OSI-layer 1, OSI-layer 2 and OSI-layer 3 protocols. The protocol mapping allows a bidirectional conversion between different types of protocols, such as Ethernet to SDH.

In a possible embodiment, the data traffic is mapped, i.e. payload mapping, OH-termination. In an alternative embodiment, a management mapping is performed, i.e. a data protocol conversion is performed.

Figure 24:
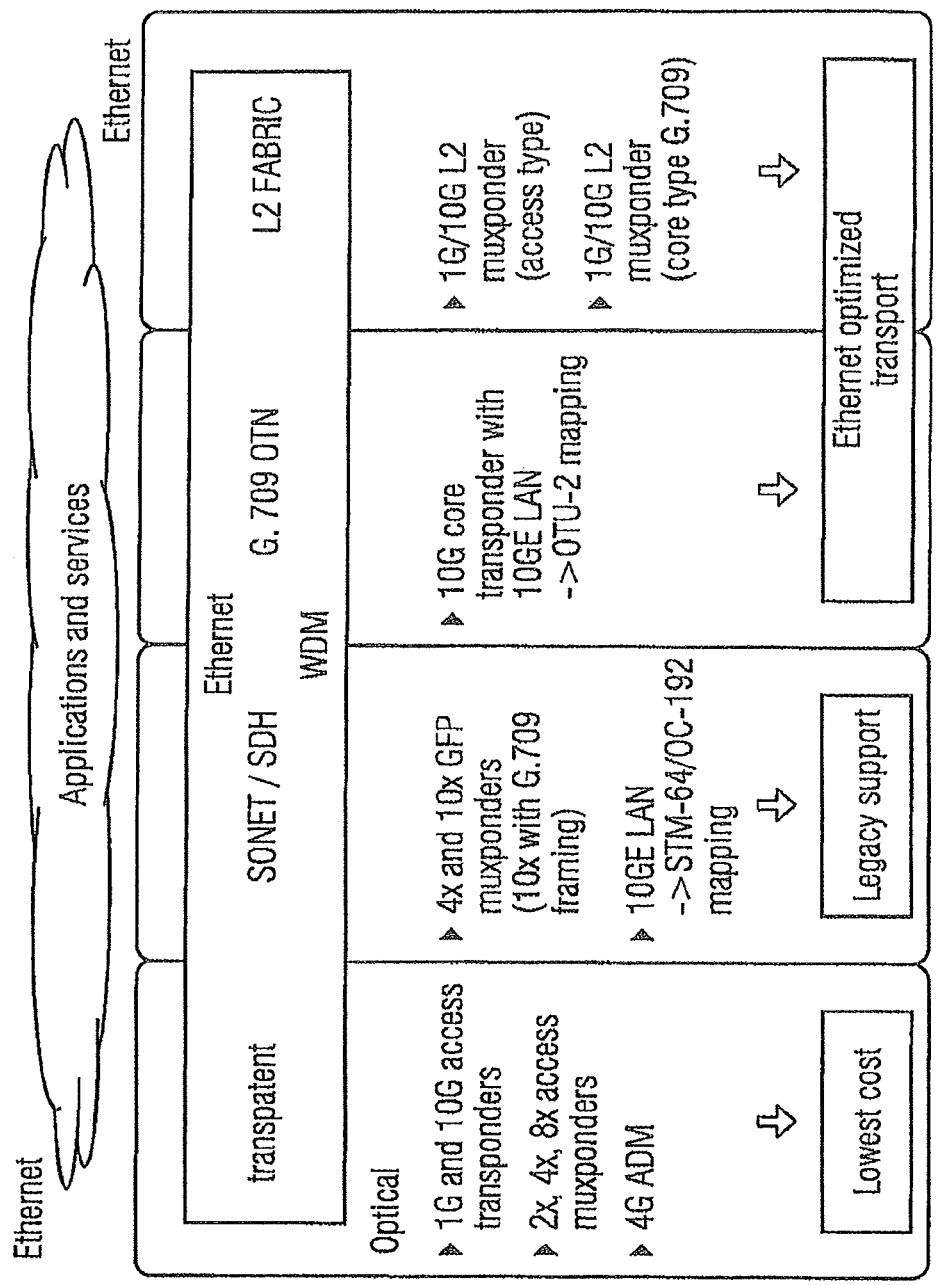
FIG. 24 illustrates an example for protocol mapping performed by the pluggable module according to the present invention.

FIG. 24 illustrates an example for protocol mapping as performed by the pluggable module 1.

Figure 25:
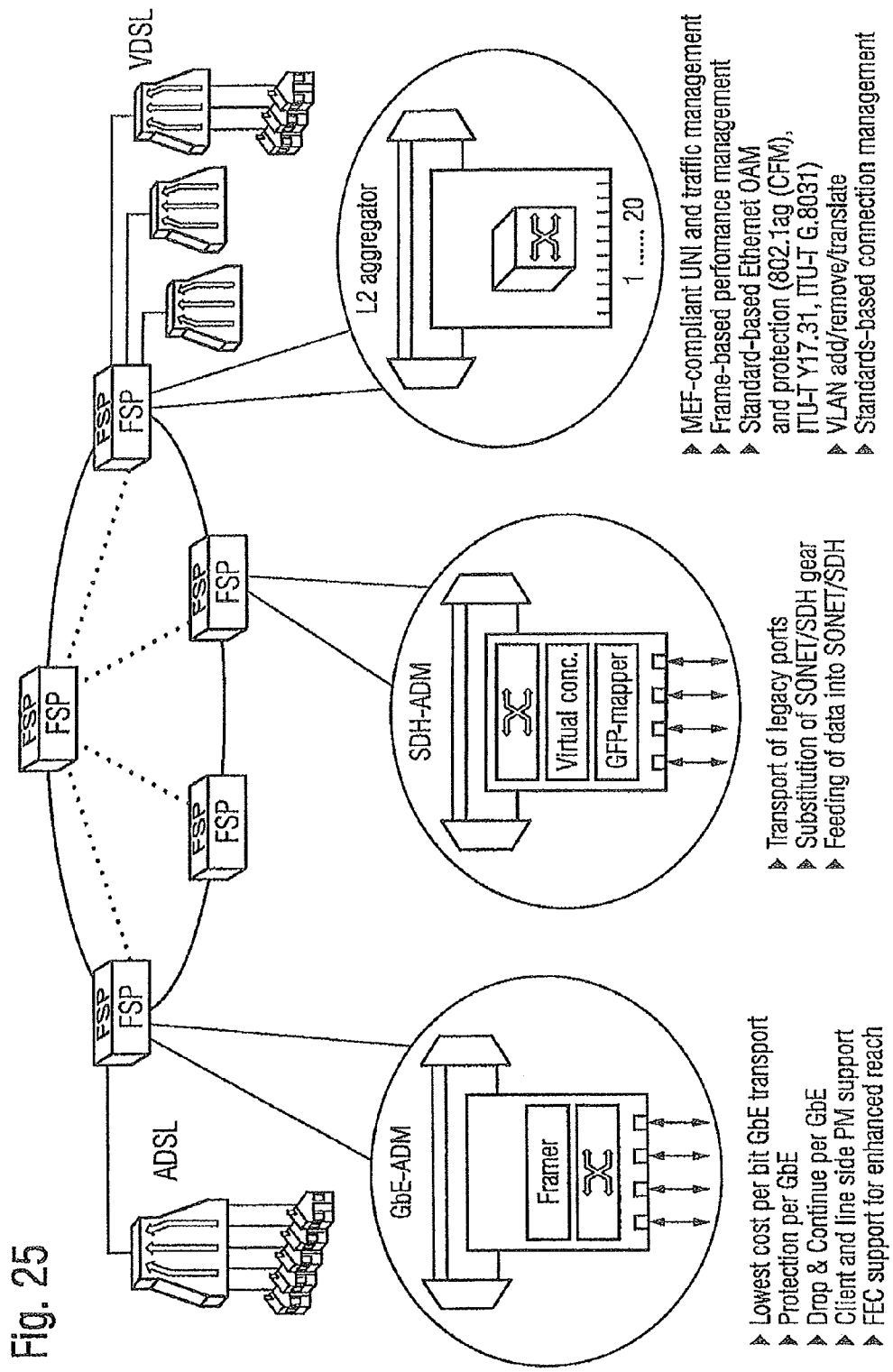
FIG. 25 illustrates possible implementations of protocol mapping functions by a pluggable module according to the present invention.

FIG. 25 illustrates possible implementations of protocol mapping functions by the pluggable module 1 according to the present invention.

In a possible embodiment of the pluggable module 1 according to the present invention, the pluggable module 1 provides a time slot based add/drop functionality between the optical network interface and an electrical host interface.

Figure 26:
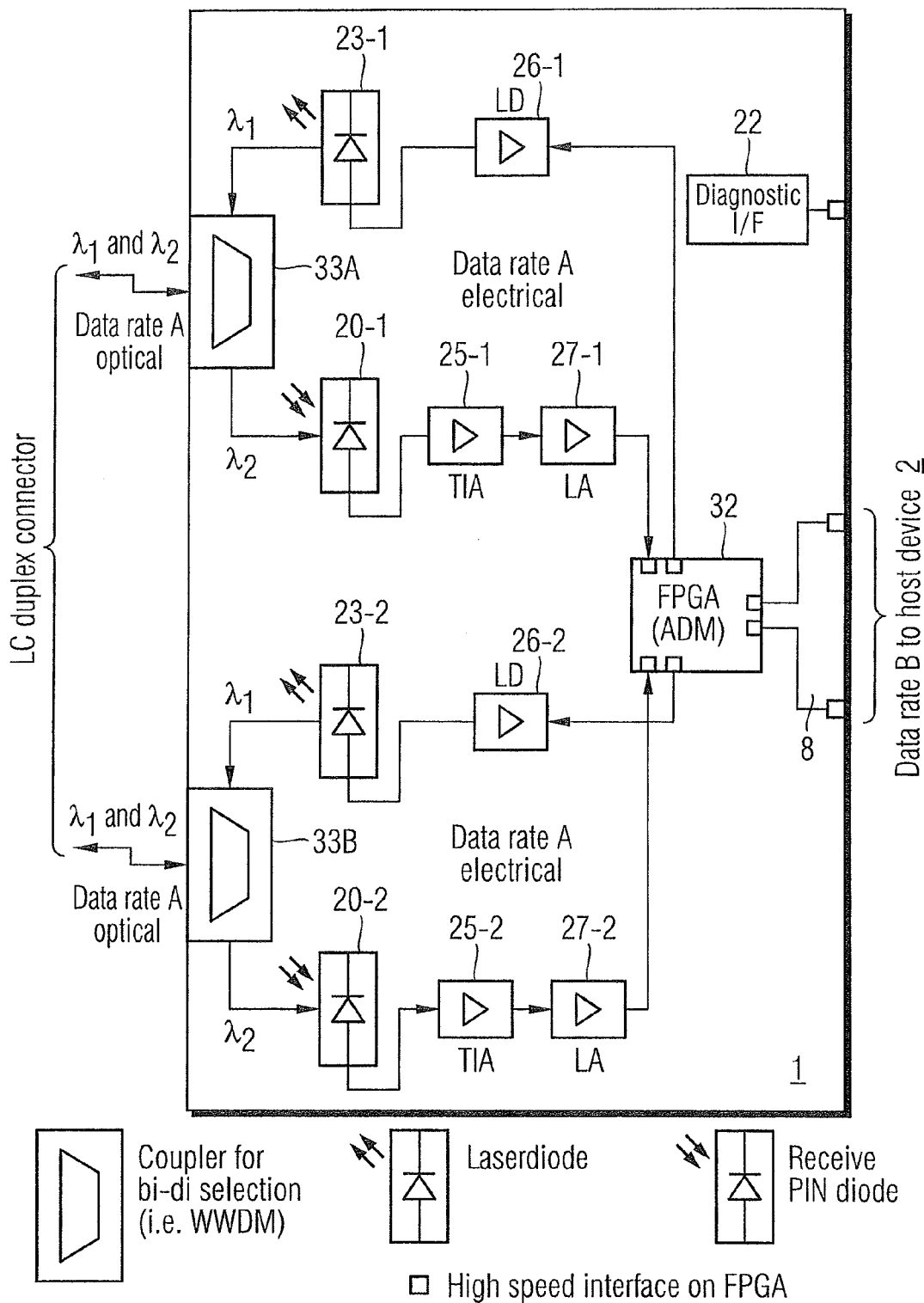
FIG. 26 shows another embodiment of the pluggable module providing single fiber working according to the present invention.

In a possible embodiment, the pluggable module 1 provides a single fiber working (SFW) on both interface ports to provide bidirectional east/west communication with an optical network as illustrated by FIG. 26. The add/drop multiplexing (ADM) functionality provided by the pluggable module 1 according to the present invention can be either proprietary or standard conform. ADM always needs east and west interfaces. Conventional pluggable modules offer only a bidirectional interface. With the pluggable module 1 according to the present invention, single fiber working (SFW) is used inside the pluggable module 1 on the existing optical ports of the pluggable module 1. As can be seen from FIG. 26, the pluggable module 1 comprises a multiplexer/demultiplexer 33A, 33B for the optical ports of the pluggable module 1. The couplers 33A, 33B are provided for bi-di selection, i.e. WWDM.

In a preferred embodiment with the ADM as employed by the pluggable module 1 according to the present invention it is possible to configure the ADM-scheme. The configuration can be performed either via the host devices 2 or independently from the host devices 2.

The embedded communication channels ECC allows a host to host communication through the pluggable module 1. The host management interface allows to set up ADM-scheme parameters.

If the configuration is performed independently from the host devices, the protocol of the embedded communication channel ECC allows to detect how many pluggable modules (M) share a common bandwidth (B). For fair bandwidth distribution, each pluggable module 1 effectively determines a fractional bandwidth B: M. The embedded communication channel ECC then automatically configures a set of M-pluggable modules 1 of a common network to a bandwidth B: M each.

In a possible embodiment, the ADM employed by the pluggable module 1 according to the present invention performs regeneration. When no bandwidth is terminated inside a node, only a passthrough is regenerated for transmission purposes. A further feature of the ADM as employed by the pluggable module 1 according to the present invention, is protection, i.e. the ability to switch between a bandwidth termination from east and west side in case of a major event. The ADM-functionality of the pluggable module 1 according to the present invention allows to connect host devices 2 in a multiple node network to share a common optical fiber infrastructure.

Figure 27A:
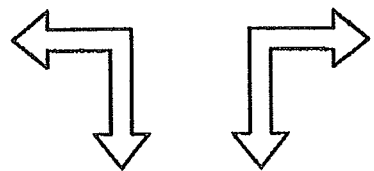
FIGS. 27A, 27B, 27C illustrate different functions by the pluggable module according to the present invention.

FIG. 27A illustrates an add/drop from west or east as performed by the pluggable module 1 according to the present invention.

Figure 27B:

FIG. 27B illustrates a passthrough (regeneration) as performed by the pluggable module 1 according to the present invention.

Figure 27C:
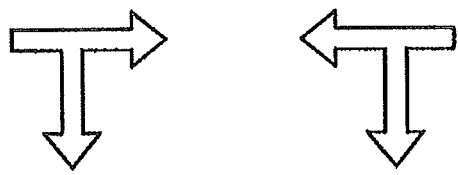

FIG. 27C illustrates a drop and continue from west or east as employed by the pluggable module 1 according to the present invention.

Those traffic switching functions can be realized within the FPGA 32 of the pluggable module 1. The east/west scenarios as shown in FIGS. 27A and 27C can be provided with optional protection switching. The traffic switching granularity can be a complete data stream (1 GB/sec., 4 GB/sec., 10 GB/sec.) or fractions of the data stream, such as time slots or data packets. A connection in east/west direction based on MSA can be achieved by single fiber working (SFW), i.e. if the transmitting and receiving directions are on the same optical fiber with different wave lengths.

FIGS. 28A, 28B illustrate MSA-compatible optical transceiver with integrated asymmetric Time Division Multiplexing TDM (TDMA) as employed by the pluggable module 1 according to an embodiment of the present invention. The host interface can be formed by a standard IEEE 802.3 interface with reduced net bandwidth (GB Ethernet or fast Ethernet or Ethernet). The FPGA 32 can be provided within the data path. The transceiver network can be either GPON/EPON based or proprietary. The bandwidth/TDMA time slot configuration can be performed via an optional host. TDMA-schemes are well-known, the most important TDMA-schemes are EPON (Ethernet PON) and GPON (Gigabit PON). PON stands for Passive Optical Network. A passive optical network is a point-to-multipoint, fiber-to-the-premises network architecture used to enable a single optical fiber to serve multiple premises. A passive optical network consists of an optical line termination (OLT) at the service provider central office and a number of optical network units (ONU) at the near end user. A PON configuration reduces the amount of fiber and central office equipment required compared to point-to-point architectures.

In order to keep MSA-compliance also on the host interface side 8 of the pluggable module 1 and to avoid the need for host adaptions when supporting the pluggable module 1 according to the present invention, it is preferred to use a standard protocol.

Due to the nature of a TDM-scheme, upstream bandwidth compared to ONU is lower than the total bandwidth in the OLT-node. The TDMA basically maps a continuous data stream into a sequence of transmission time intervals.

A feature of the ADM-scheme as employed by the pluggable module 1 according to the present invention is the capability to configure the ADM-scheme.

In an embodiment of the pluggable module 1, the configuration of the ADM-scheme is performed via host devices 2. An embedded communication channel ECC enables a host-to-host communication through the pluggable module 1. A host management interface allows to set up TDMA-scheme parameters.

In an alternative embodiment, the configuration is performed independently from the host devices 2. In a further embodiment, an embedded communication channel ECC protocol allows to detect how many pluggable modules (M) share a common upstream bandwidth (B). For fair bandwidth distribution each pluggable module 1 gets the allowance to send a fractional bandwidth of size B:M in an upstream direction. The ECC then automatically configures a set of M pluggable modules 1 in a common network to upstream bandwidth B:M each.

The ADM-functionality of the pluggable module 1 according to the present invention allows to connect host devices 2 in a multiple node-star-network according to a so-called PON-structure that shares a common optical fiber infrastructure The pluggable module 1 according to the present invention, with the TDMA-function allows to connect a plurality of devices over a PON-infrastructure for additional active data transport devices. The host device 2 can comprise a standard transceiver port. The host device 2 receives an Ethernet data stream with a data throughput which is a fraction of the complete Ethernet bandwidth. In a possible embodiment, the configuration of the bandwidth is performed automatically within the TDMA. In an alternative embodiment, the configuration is performed by transferring configuration parameters.

The pluggable module 1 according to the present invention performs in a possible embodiment an optical amplification or optical attenuation, optical test functions and an optical dispersion compensation. With this functionality it is possible to connect host devices 2 in an optical network comprising sophisticated optical functions like wavelength division multiplexing (WDM) over longer distances between termination nodes that require a power level and dispersion management. The pluggable module 1 according to the present invention performs in an embodiment a monitoring and a manipulation of optical signals.

What is claimed is:

1. A network comprising:
    at least one host device having an interface card connected to a backplane of said host device,
    wherein said interface card comprises at least one cage for receiving a pluggable module which performs a traffic management of data transported via at least one optical fibre connected to said pluggable module,
    wherein said pluggable module comprises an embedded communication channel for exchanging management data, administrative data and performance monitoring data between said pluggable module and a far end device,
    wherein said far end device is a pluggable module, and
    wherein said pluggable module performs protocol mapping functions between different types of data transport protocols of said data transported via at least one optical fibre connected to said pluggable module.

2. The network according to claim 1, wherein said traffic management is performed in an electrical domain.

3. The network according to claim 1, wherein said traffic management is performed in an optical domain.

4. The network according to claim 1, wherein said traffic management comprises near end and far end traffic management of said transported data.

5. The network according to claim 4, wherein the pluggable module performs near end and far end bidirectional performance monitoring.

6. The network according to claim 1, wherein the traffic management is based on a communication between said pluggable module and a far end pluggable module.

7. The network according to claim 1, wherein said pluggable module performs a link test.

8. The network according to claim 1, wherein said protocol mapping is configurable.

9. The network according to claim 1, wherein said pluggable module performs monitoring and manipulation of optical signals.

10. A pluggable module for bidirectional transport of data via at least one optical fibre between host devices, comprising:
    an embedded communication channel for exchanging management data, administrative data and performance monitoring data between said pluggable module and a far end device,
    wherein said far end device is a pluggable module,
    wherein said pluggable module is adapted to be pluggable into a corresponding cage of one of said host devices and performs a traffic management of said transported data, and
    wherein said pluggable module performs protocol mapping functions between different types of data transport protocols of said data transported via at least one optical fibre connected to said pluggable module.

11. A host device comprising at least one interface card connected to a backplane of said host device, wherein said interface card comprises at least one cage for receiving a pluggable module according to claim 10 which performs a traffic management of data transported via an optical fibre connected to said pluggable module.

12. An interface card for a host device comprising at least one cage for receiving a pluggable module according to claim 10 which performs traffic management of data transported via an optical fibre connected to said pluggable module.

13. A data transport system for transporting bidirectional optical data via at least one optical fibre, wherein at one or at both ends of said optical fibre a pluggable module according to claim 10 is attached which performs a traffic management of said transported data.

14. A method for bidirectional transport of data between host devices of a network via at least one optical fibre, comprising:
    performing traffic management during transport of the optical data by a pluggable module,
    wherein the pluggable module is attached to said optical fibre and is connected to a corresponding cage of one of said host devices and a traffic management during transport of the optical data is performed by said pluggable module,
    wherein said pluggable module comprises an embedded communication channel for exchanging management data, administrative data and performance monitoring data between said pluggable module and a far end device,
    wherein said far end device is a pluggable module, and
    wherein said pluggable module performs protocol mapping functions between different types of data transport protocols of said data transported via at least one optical fibre connected to said pluggable module.

* * * * *